(12) United States Patent
Greenstein et al.

(10) Patent No.: US 10,911,367 B2
(45) Date of Patent: Feb. 2, 2021

(54) COMPUTERIZED METHODS AND SYSTEMS FOR MANAGING CLOUD COMPUTER SERVICES

(71) Applicant: ORACLE INTERNATIONAL CORPORATION, Redwood Shores, CA (US)

(72) Inventors: Paul G. Greenstein, Hopkinton, MA (US); Michael J. Carlson, Missoula, MT (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/271,966

(22) Filed: Feb. 11, 2019

(65) Prior Publication Data

US 2020/0007456 A1  Jan. 2, 2020

Related U.S. Application Data

(60) Provisional application No. 62/690,515, filed on Jun. 27, 2018.

(51) Int. Cl.
| | | |
|---|---|---|
| *H04L 12/911* | (2013.01) | |
| *H04L 12/863* | (2013.01) | |
| *G06F 9/455* | (2018.01) | |

(52) U.S. Cl.
CPC .......... *H04L 47/70* (2013.01); *G06F 9/45558* (2013.01); *H04L 47/50* (2013.01); *G06F 2009/45595* (2013.01); *H04L 47/748* (2013.01)

(58) Field of Classification Search
None
See application file for complete search history.

(56) References Cited

U.S. PATENT DOCUMENTS

| | | | |
|---|---|---|---|
| 7,383,405 B2 | 6/2008 | Vega et al. | |
| 8,046,767 B2 | 10/2011 | Rolia et al. | |

(Continued)

FOREIGN PATENT DOCUMENTS

| | | |
|---|---|---|
| CN | 102629207 A | 8/2012 |
| CN | 102655503 B | 9/2015 |

OTHER PUBLICATIONS

Rolia et al., A Capacity Management Service for Resource Pools, ACM Digital Library, pp. 1-2, downloaded on Jan. 25, 2018 from: https://dl.acm.org/citation.cfm?id=1071047.

(Continued)

*Primary Examiner* — James A Edwards
(74) *Attorney, Agent, or Firm* — Kraguljac Law Group, LLC

(57) ABSTRACT

Systems, methods, and other embodiments associated with managing instances of services are described. In one embodiment, a method includes constructing pre-provisioned instances of a service within a first pool and constructing pre-orchestrated instances of the service within a second pool. In response to receiving a request for the service, the method executes executable code of a first pre-orchestrated instance as an executing instance and removing the pre-orchestrated instance from the second pool. A pre-provisioned instance is selected from the first pool to create a second pre-orchestrated instance within the second pool, and the pre-provisioned instance is removed from the first pool.

20 Claims, 11 Drawing Sheets

(56) References Cited

U.S. PATENT DOCUMENTS

| | | | |
|---|---|---|---|
| 8,316,130 B2 | 11/2012 | Breiter et al. | |
| 8,463,908 B2 | 6/2013 | Murray et al. | |
| 8,595,722 B2 | 11/2013 | Gupta et al. | |
| 8,639,793 B2 | 1/2014 | Kapur et al. | |
| 8,726,283 B1* | 5/2014 | Rubinstein | G06F 9/524 718/102 |
| 9,069,590 B2 | 6/2015 | Gupta | |
| 9,141,487 B2 | 9/2015 | Jagtiani et al. | |
| 9,152,405 B2 | 10/2015 | Gupta et al. | |
| 9,189,259 B2 | 11/2015 | Anderson et al. | |
| 9,250,944 B2 | 2/2016 | Anderson et al. | |
| 9,251,349 B2 | 2/2016 | Haikney et al. | |
| 9,253,114 B2* | 2/2016 | Anderson | G06F 9/5077 |
| 9,285,196 B2 | 2/2016 | Dettori et al. | |
| 9,361,092 B1 | 6/2016 | Bai et al. | |
| 9,396,220 B2 | 7/2016 | Li et al. | |
| 9,405,530 B2 | 8/2016 | Islam et al. | |
| 9,471,350 B2 | 10/2016 | Pavlas et al. | |
| 9,569,259 B2 | 2/2017 | Fries et al. | |
| 9,582,319 B2 | 2/2017 | Ayala et al. | |
| 9,606,826 B2 | 3/2017 | Ghosh et al. | |
| 9,705,820 B2 | 7/2017 | Madduri et al. | |
| 9,712,503 B1 | 7/2017 | Ahmed et al. | |
| 9,736,252 B2 | 8/2017 | Ferris et al. | |
| 9,755,990 B2 | 9/2017 | Vicaire | |
| 9,779,126 B2 | 10/2017 | Tu et al. | |
| 9,946,578 B2* | 4/2018 | Huang | H04L 67/14 |
| 9,952,903 B2* | 4/2018 | Kishan | G06F 9/5011 |
| 10,223,647 B1* | 3/2019 | Ward, Jr. | G06Q 10/00 |
| 10,339,101 B1* | 7/2019 | Gupta | G06F 16/128 |
| 2006/0230149 A1* | 10/2006 | Jackson | G06F 9/5027 709/226 |
| 2008/0022284 A1 | 1/2008 | Cherkasova et al. | |
| 2010/0281285 A1 | 11/2010 | Blanding | |
| 2013/0159453 A1 | 6/2013 | McLean | |
| 2013/0297905 A1* | 11/2013 | Yang | G06F 12/02 711/165 |
| 2014/0075032 A1* | 3/2014 | Vasudevan | H04L 41/50 709/226 |
| 2014/0365626 A1* | 12/2014 | Radhakrishnan | H04L 67/1002 709/222 |
| 2015/0046595 A1* | 2/2015 | Anderson | G06F 9/5077 709/226 |
| 2015/0286507 A1* | 10/2015 | Elmroth | G06F 11/3442 718/104 |
| 2015/0372938 A1 | 12/2015 | Patel et al. | |
| 2015/0372941 A1 | 12/2015 | Patel et al. | |
| 2016/0301746 A1* | 10/2016 | Bauer | G06F 9/50 |
| 2016/0378524 A1 | 12/2016 | Gough et al. | |
| 2017/0063615 A1* | 3/2017 | Yang | H04L 41/5054 |
| 2017/0116207 A1 | 4/2017 | Lee et al. | |
| 2017/0116213 A1 | 4/2017 | Jain et al. | |
| 2017/0116249 A1 | 4/2017 | Ravipati et al. | |
| 2017/0116298 A1 | 4/2017 | Ravipati et al. | |
| 2017/0116334 A1 | 4/2017 | Kruglikov et al. | |
| 2017/0187806 A1 | 6/2017 | Wang et al. | |
| 2018/0075041 A1 | 3/2018 | Susairaj et al. | |
| 2018/0075044 A1 | 3/2018 | Kruglikov et al. | |
| 2018/0113684 A1* | 4/2018 | Dawson | H04L 67/10 |
| 2018/0165698 A1* | 6/2018 | Chandrashekar | G06Q 30/0206 |
| 2018/0262413 A1* | 9/2018 | Sureka | H04L 47/748 |
| 2018/0270128 A1* | 9/2018 | Auvenshine | H04L 43/16 |
| 2019/0163460 A1* | 5/2019 | Kludy | G06F 21/606 |

OTHER PUBLICATIONS

De et al., Caching Techniques for Rapid Provisioning of Virtual Servers in Cloud Environment, IEEE Conference Publication, pp. 1-3, downloaded Jan. 24, 2018 from: http://ieeexplore.ieee.org/document/6211956/.

De et al., Caching VM Instances for Fast VM Provisioning: A Comparative Evaluation; IBM Research India, pp. 1-11, downloaded on Mar. 9, 2018 from: https://www3.cs.stonybrook.edu/~prade/MyPubs/2012-europar.pdf.

Bankole et al., Predicting Cloud Resource Provisioning Using Machine Learning Techniques; IEEE Xplore Digital Library, pp. 1-2, downloaded on Mar. 9, 2018 from: http://ieeexplore.ieee.org/document/6567848.

Amazon Web Services, Migrating AWS Resources to a New AWS Region, pp. 1-43, downloaded on Mar. 8, 2018 from: https://d0.awsstatic.com/whitepapers/aws-migrate-resources-to-new-region.pdf.

Geier, Moving EC2 Instances Across Availability Zones or AWS Regions, pp. 1-4, downloaded on Jan. 24, 2018 from: https://www.serverwatch.com/server-tutorials/moving-ec2-instances-across-availability-zones-or-aws-regions.html.

Google, Moving an Instance Between Zones, pp. 1-5, downloaded Jan. 19, 2018 from: https://cloud.google.com/compute/docs/instances/moving-instance-across-zones.

Google, Live Migration, pp. 1-4, downloaded Jan. 19, 2018 from: https://cloud.google.com/compute/docs/instances/live-migration.

VMware, Inc., VMware VMotion, Live Migration of Virtual Machines Without Service Interruption, pp. 1-2, downloaded on Jan. 19, 2018 from: https://www.vmware.com/pdf/vmotion_datasheet.pdf.

KVM, Migration, pp. 1-4, downloaded Jan. 19, 2018 from: https://www.linux-kvm.org/page/Migration.

Alibaba Cloud, ApsaraDB for RDS, User Guide, pp. 1-79, downloaded Jan. 19, 2018 from: https://www.alibabacloud.com/help/doc-detail/26181.htm.

Flanegin, Oracle Access Manager—Upgrade Guide, Oct. 2007, pp. 1-654, downloaded on Mar. 9, 2018 from: https://docs.oracle.com/cd/E12530_01/oam.1014/b32416/zdt_ovr.htm.

Balaji et al., Predictive Cloud Resource Management Framework for Enterprise Workloads, Journal of King Saud University—Computer and Information Sciences, 2018, pp. 404-415.

Scott Scovell, Migrating Azure Virtual Machines to Another Region / Kloud Blog, Nov. 16, 2014, pp. 1-20.

* cited by examiner

COMPUTERIZED METHODS AND SYSTEMS FOR MANAGING CLOUD COMPUTER SERVICES

CROSS REFERENCE TO RELATED APPLICATIONS

This disclosure claims the benefit of U.S. Provisional Patent Application Ser. No. 62/690,515 filed Jun. 27, 2018, titled "Computerized Methods and Systems for Managing Cloud Computer Services", which is incorporated by reference herein in its entirety.

BACKGROUND

Cloud computing is an information technology (IT) paradigm that enables ubiquitous access to shared pools of configurable system resources and higher-level services that can be rapidly provisioned with minimal management effort, often over the Internet. Third-party clouds enable organizations to focus on their core businesses instead of expending resources on computer infrastructure and maintenance. Cloud providers typically use a "pay-as-you-go" model, a subscription model, or a variety of other models. A cloud computing environment (aka "cloud environment) is a collection of physical and virtual infrastructure hardware and software used for cloud computing. The cloud computing environment can be used to provide services (known as "cloud services").

The combination of Virtual Machines (VMs), network connectivity among them, their operating systems, and middleware and application software stacks on each VM comprise a service instance. In Oracle cloud services, for example, each service includes a routing tier, a middle tier, and possibly a data tier. Usually, the routing and data tiers are shared among multiple middle tier service instances (hereinafter, instances). Instances are standardized and comprised of a collection (particular to each service) of VM shapes (specifications of CPU, memory, storage).

Cloud services are provisioned on-demand. When a customer orders a service, an order processing system receives the type of service being ordered and submits the request to a service provisioning system, which initiates service provisioning. Service provisioning involves creation, configuration, and startup of the instance. This is a lengthy process that typically takes minutes, but sometimes, under high-demand, can take hours.

The cloud computing environment hosts various services (cloud services) that can be accessed remotely (by remote devices, programs, or people) over a network. As used herein, a remote device accessing the cloud computing environment may correspond to a program executing code, a user, etc. utilizing a remote device (hardware or software) to access the cloud computing environment over a network. Some cloud services are shared—all users access the same instance of a service. Other cloud services require existence of a service instance per user or group of users. The latter, in order to be used by a particular party, need to be provisioned. In prior systems, all cloud services require existence of a service instance per user or group of users. In some cases this group of users included all users. Regardless of the mapping of instances to users, provisioning is always required. Even if all users share the only existing instance, someone had to provision that instance and, likely, provide user access to it.

A user will subscribe to the cloud computing environment by providing identifying information and an intent to utilize one or more services in the future. Once the subscriber is defined, the subscriber can request access to a service instance. When a request for access to the service is received from a remote device, an instance of the service is created on-demand and executed. On-demand creation and execution of the instance is triggered when the cloud computing environment receives the request for access to the service. A service instance (hereinafter "instance") is a collection of one or more computing resource(s) interrelated in a way defined by the particular service and comprising an orderable and provisionable unit of the service. The instance can be hosted within a virtual machine that executes software of the service using processor, memory, and storage resources of the cloud computing environment. The instance can be comprised of a collection of virtual machines of diverse shapes.

On-demand creation of an instance of a service is time consuming and consumes a large amount of computing resources. The time to create the instance can take minutes or even hours when the cloud computing environment is experiencing high demand. This introduces significant delays in availability of the service to the requestor because the requestor cannot access the service until the instance is fully created and executing. Further, there may not be adequate computing resources available or reserved for the creation of the instance when the request is received, and thus the creation of the instance is further delayed.

When an instance is created, the instance is created within a particular zone of the cloud computing environment. A zone comprises a pool of available resources such as processor, memory, storage, network, and/or other computing resources that can be used by executing instances. The zone can be defined as a logical or physical entity for hosting instances of services utilizing virtual machines and the computing resources of the zone. In this way, the zone is an elastic operational environment that is able to adapt to service workload changes by provisioning and decommissioning computing resources in an autonomic manner. The cloud computing environment, such as one or more data centers, can comprise a plurality of zones.

Capacity management attempts to provide for non-disruptive operation so that there will be adequate resource capacity to meet demand while minimizing operational costs of resource consumption. Technical processes for capacity management create projections and forecasts that are used to provision and/or allocate additional resources or provide alerts of future resource exhaustion. Unfortunately, these projections and forecasts can be imprecise. This can lead to inefficient and incorrect resource allocation decisions. Furthermore, the effects of lifecycle changes of resources and unexpected events, such as a deployment of a service for a large number of clients in a short time span, are unpredictable. This unpredictability contributes to inefficient and incorrect resource allocation decisions.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
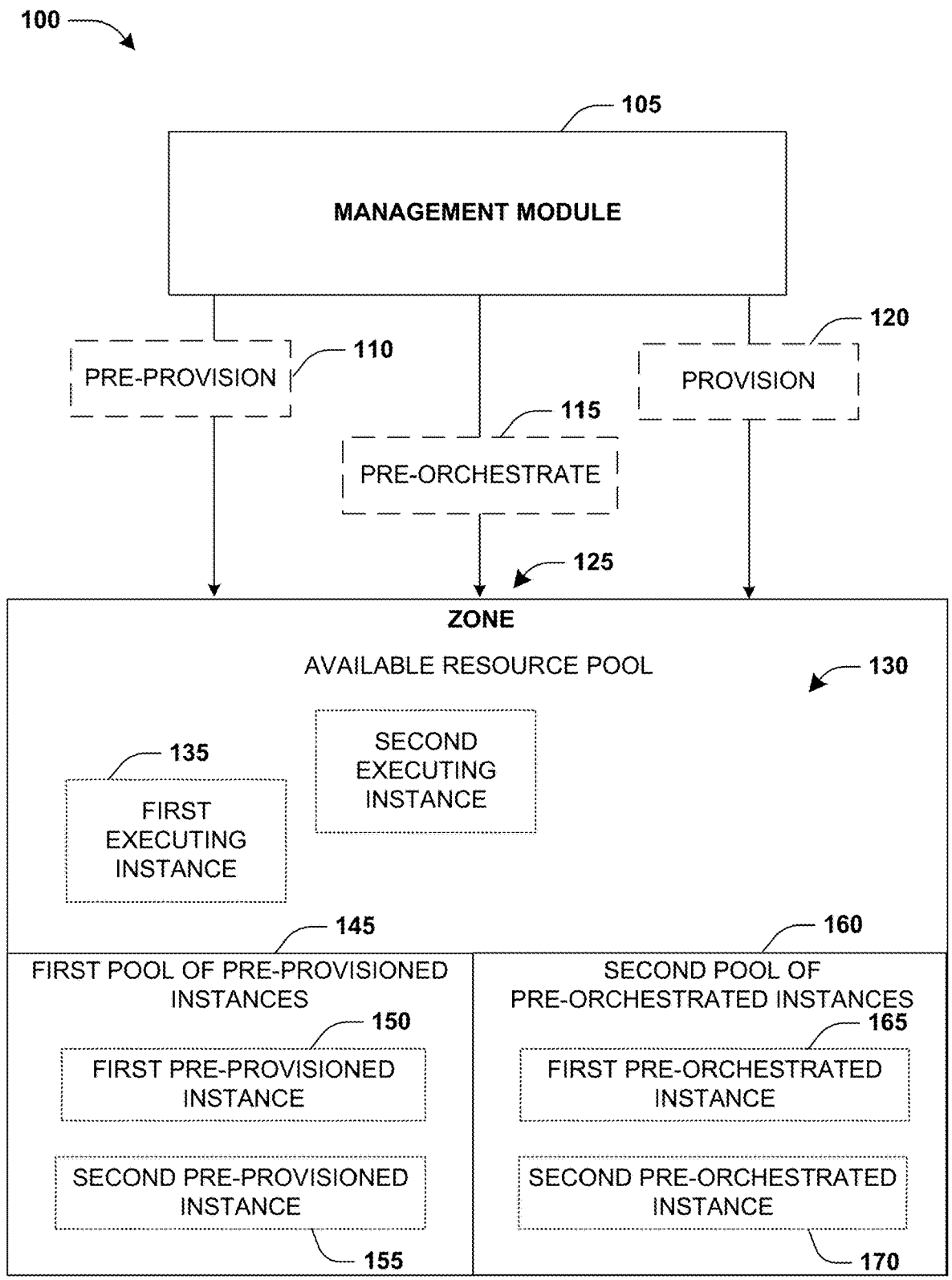
FIG. 1 illustrates an embodiment of a system associated with managing instances of services.

Computerized systems and methods are described herein that provide for managing instances of computer-implemented services. A cloud computing environment or other computing system is capable of executing instances of services (e.g., services that are requested by remote computing devices). A service comprises an application stack. The application stack comprises one or more application programs having executable code that is executed using computing resources of the cloud computing environment. For example, the application stack is a suite or group of application programs that are executed to work together to achieve a common goal. The cloud computing environment may host a variety of services. For example, a service may comprise a calendar service, an email service, a financial analysis service, or any other type of applications that can be executed by the cloud computing environment.

As used herein, a "pre-provisioned instance" includes a configured collection of Virtual Machines (VMs) and service-supporting dependencies including computer resources. This is an initial resource configuration but has no specific application software loaded. The pre-provisioned instance is proactively constructed in advance of an anticipated demand for a service so the system can more quickly setup and provide the service when needed. The pre-provisioned instance does not include application software (executable code) of a service and is not yet assigned to a customer in production.

A "provisioned instance" is a pre-provisioned instance that includes the application software for a requested service. The provisioned instance is also uniquely assigned to a customer and is executing in a production setting (referred to as a production instance).

A "pre-orchestrated instance" is a pre-provisioned instance that includes the application software (e.g., initial resource configuration+application software installed) but is not yet assigned to a customer for execution in production.

An "orchestrated instance" is a pre-orchestrated instance that is uniquely assigned to a customer and is executing in a production setting (i.e., a production instance). Thus, an orchestrated instance and a provisioned instance are the same.

A "pointer" as used in one or more embodiments is a means of locating an instance. Pointers and/or tags are used to assign or add (hereinafter referred to as 'assignment') an instance to a selected pool of instances. Pointers are stored and maintained in a data structure stored in a memory. A service instance is typically identified and referred to by a pointer or tag in one of several ways. For example, (1) by an IP address of one of the elements of the instance (such as a front-end load balancer, but possibly one VM of the instance); (2) by a URL or URI of the instance (for example, pointing at the front-end load balancer, but may be directly at VM's Web destination or Web service end point, such as REST or SOAP); (3) by symbolic name translatable via DNS (domain name server) into an IP address (thus reduced to 1); (4) by symbolic name (or tag) translatable by an inventory system into the one of the examples 1-3 above; or (5) by variations of the previous examples. In another embodiment, even though an instance does not have to contain a pointer, the pointer contains the identification of that instance. Thus, if the instance is known, its pointer can be found in one of the pools by searching for the identification within the pointers. If the pointer is not found in a pool, then the instance has not been assigned to that pool.

A "pool" of instances, in one embodiment, is defined by a collection of instance pointers that identifies the instances that belong to (are assigned to) the pool. For example, a data structure is created to maintain the collection of instance pointers for each pool. When an instance is assigned to a pool, its instance pointer is added to the corresponding collection of pointers for that pool (e.g., a pool pointer list). When an instance is removed from a pool, its pointer is removed from the corresponding collection of pointers. Moving an instance from pool 1 to pool 2 is a combination of removing the pointer from pool 1 and adding the pointer to the collection of pointers for pool 2.

An instance of a service is provisioned by configuring one or more VM shapes (e.g., specifications of CPU, CPU cycles, a number of processors, memory resources, storage resources, and networking resources) to a computing environment. The computing environment, such as a virtual machine, uses the allocated resources to execute the executable code of the service through the provisioned instance. That is, a provisioning system determines an appropriate shape and uses resources to create one or more virtual machines to execute a service instance being provisioned. In one embodiment, resources include instances of other services. For example, a service requires a network load balancer and a database. The service will make use of a Load Balancer as a Service (LBaaS) and a DataBase as a Service (DBaaS) as ready, separately provisionable, service instances. The provisioning system may be called (e.g., recursively) to provision lower level services for use by the new service instance being provisioned. In this way, a remote device can access functionality of the service through the executing provisioned instance hosted by the cloud computing environment.

Zones are defined within the cloud computing environment for hosting instances. A zone comprises a pool of available resources such as processor, memory, storage, network, and/or other computing resources that can be used by instances assigned to that zone for execution. The zone is an elastic operational environment that is able to adapt to service workload changes by provisioning and decommissioning computing resources used by instances in an autonomous manner. The zone can be defined as a logical or physical entity for hosting instances of services utilizing virtual machines and the computing resources of the zone. The cloud computing environment, such as one or more data centers, can comprise a plurality of zones.

As provided herein, operation of the cloud computing environment is improved by automating capacity management for services within and/or across zones. Capacity management is provided for the cloud computing environment through the management of pools of pre-provisioned instances, pre-orchestrated instances, and provisioned executing instances. Pre-provisioned instances are constructed by configuring and defining a selected set of available resources to create a computing environment configured for subsequent installation and execution of executable code of a service. Pre-orchestrated instances are constructed by installing the executable code into pre-provisioned instances. Provisioned instances of a service are created by assigning the pre-orchestrated instance to a client device (customer) and executing the executable code within the pre-orchestrated instance in a production environment.

Capacity management is provided by creating and maintaining certain numbers of pre-provisioned instances and pre-orchestrated instances so that provisioned executing instances can be quickly and efficient created and assigned when requested. In particular, pre-provisioned instances are proactively created ahead of time because the allocation and creation of the computing environment can be time consuming, such as taking minutes or hours under heavy load. Installing the executable code into pre-provisioned instances to create the pre-orchestrated instances is less time consuming, but the executable code will have to be maintained such as being upgraded when the service is updated.

Thus, a pool of pre-provisioned instances and another pool of pre-orchestrated instances are maintained. In this way, if up-to-date pre-orchestrated instances are available (which contain upgraded software code), they can be used to very quickly provision executing instances by merely executing the computing environment and executable code. Otherwise, pre-provisioned instances can be used by installing the executable code into a selected pre-provisioned instance (created a pre-orchestrated instance), assigning the pre-orchestrated instance to a requesting customer, and executing the computing environment and executable code. Both pre-provisioning techniques are much faster than creating executing instances from scratch, and ensures there are adequate available resources at the time of a request for a service (provisioning the service).

Initiating execution of the executable code within the pre-orchestrated instances to create the executing instances takes less time than creating the pre-provisioned instances. Thus, when requests for the service are received, any number of pre-orchestrated instances can be assigned to a requesting client and provisioned quickly with little to no delay in service availability to the client that is caused by the provisioning process. The ability to quickly provision any number of executing instances reduces a time delay or elapsed time that the client computers would otherwise experience in waiting for executing instances to be constructed from scratch. In this way, capacity management has the ability to automatically react to unexpected events and lifecycle changes and can quickly react to any resource utilization changes.

Capacity management is also provided by establishing and utilizing a feedback loop of current, historic, and predicted demand for services. This feedback loop can be used to proactively create more pre-provisioned instances and/or pre-orchestrated instances. The feedback loop can also be used to determine when and how many pre-provisioned instances and/or pre-orchestrated instances should be decommissioned. For example, a feedback loop is used to enable better prediction based on historical data. This optimizes the sizes of various pools for the expected (forecasted) demand. Decommissioning instances frees up available resources that can be reallocated for other purposes. This also improves the efficiency and operation of computers within the cloud computing environment by ensuring resource availability.

Capacity management introduces fully automated predictive capacity management capable of resource optimization without human intervention. In particular, pools of pre-provisioned instances and pre-orchestrated instances can be created within multiple zones. This allows for dynamic load balanced distribution of workload across zones because pre-orchestrated instances in one zone can be used to quickly migrate instances from other zones. In this way, instances within a zone experiencing heavy demand and low resource availability can be migrated to zones with lower demand and more available resources.

With reference to FIG. 1, one embodiment of a system 100 associated with managing instances of services is illustrated and summarized. A more detailed description is provided with reference to FIG. 2. The system 100 is implemented as a management module 105 hosted on a computing device. In one embodiment, the management module 105 is associated with a cloud computing environment that hosts services made accessible to remote devices (e.g., an application, a user, a computer, executing code, etc.). Such services can correspond to cloud services, Software as a Service (SaaS), network storage, and a wide variety of other software applications and computer implemented services. Such instances of services are executed using computing resources of the cloud computing environment.

The management module 105 is configured to manage instances of services by providing capacity management for the cloud computing environment. The capacity management can be provided within or across zones of the cloud computing environment. A zone of computing resources of the cloud computing environment can be defined as a logical or physical entity for hosting instances of services utilizing computing resources of that zone, which in one embodiment may comprise virtual machines and/or resources. For example, a zone 125 is defined to comprise an available resource pool 130 of processor, memory, storage, network, and/or other computing resources. In this way, executing instances of services can be executed within the zone 125 using computing resources from the available resource pool 130. Any number of zones may be defined. Thus, other executing instances of services can be separately executed within the other zones using available resource pools of those zones. The zones may be in the same or different data centers.

The management module 105 maintains a first pool 145 of pre-provisioned instances of a service. The management module 105 constructs 110 pre-provisioned instances within the first pool 145. In one embodiment, a first pre-provisioned instance 150 is constructed 110 by allocating available resources from the available resource pool 130 to the first pre-provisioned instance 150. The available resources are allocated to construct a computing environment of computing resources configured for subsequent installation and execution of executable code of the service. The executable code can correspond to an application stack of one or more software applications executed by the service. In this way, any number of pre-provisioned instances, such as a second pre-provisioned instance 155, are constructed 110 within the first pool 145. Pre-provisioned instances can be dynamically constructed and/or decommissioned at any time based upon historic service demand, predicted future service demand, trending service demand, etc.

The management module 105 maintains a second pool 160 of pre-orchestrated instances of the service. The management module 105 constructs 115 pre-orchestrated instances within the second pool 160. In one embodiment, a first pre-orchestrated instance 165 is constructed by retrieving and installing the executable code into a pre-provisioned instance from the first pool 145. The executable code is installed in a non-executing state, and is not executed until subsequent provisioning. In this way, any number of pre-orchestrated instances, such as a second pre-orchestrated instance 170, are constructed 115 within the second pool 160.

Pre-orchestrated instances can be dynamically constructed and/or decommissioned at any time based upon historic service demand, predicted future service demand, trending service demand, etc. The executable code within the pre-orchestrated instances can be maintained with the latest version of the service. For example, a software update of the service can be identified and retrieved from a provider of the service. The software update can be applied to the executable code within the pre-orchestrated instances thereby upgrading the software code that is installed in the pre-orchestrated instance.

The management module 105 provisions pre-orchestrated instances within the second pool 160 as executing instances in response to requests for execution of the service. This is represented by block "Provision 120" in FIG. 1. In one embodiment, the management module 105 receives a request from a remote device for access to an email service. The management module 105 provisions 120 a pre-orchestrated instance for the email service from the second pool 160.

The pre-orchestrated instance is provisioned 120 by executing the executable code of the pre-orchestrated instance using the computing environment of computing resources allocated to the pre-orchestrated instance. In this way, a first executing instance 135 of the email service is provisioned 120 from the pre-orchestrated instance. The first executing instance 135 executes the executable code using the computing resources that were assigned from the available resource pool 130 to the pre-orchestrated instance.

Constructing the computing environment and installing the executable code can take a significant amount of time and resources. Thus, these tasks are proactively performed ahead of time before there is a request for the service. Executing the executable code within the pre-orchestrated instances to create the executing instances takes little to no time. Thus, when requests for the service are received, any number of pre-orchestrated instances can be provisioned quickly. The ability to quickly provision any number of executing instances reduces the delay in service availability to a requesting client device due to provisioning that the client device would otherwise experience in waiting for executing instances to be constructed from scratch.

Figure 2:
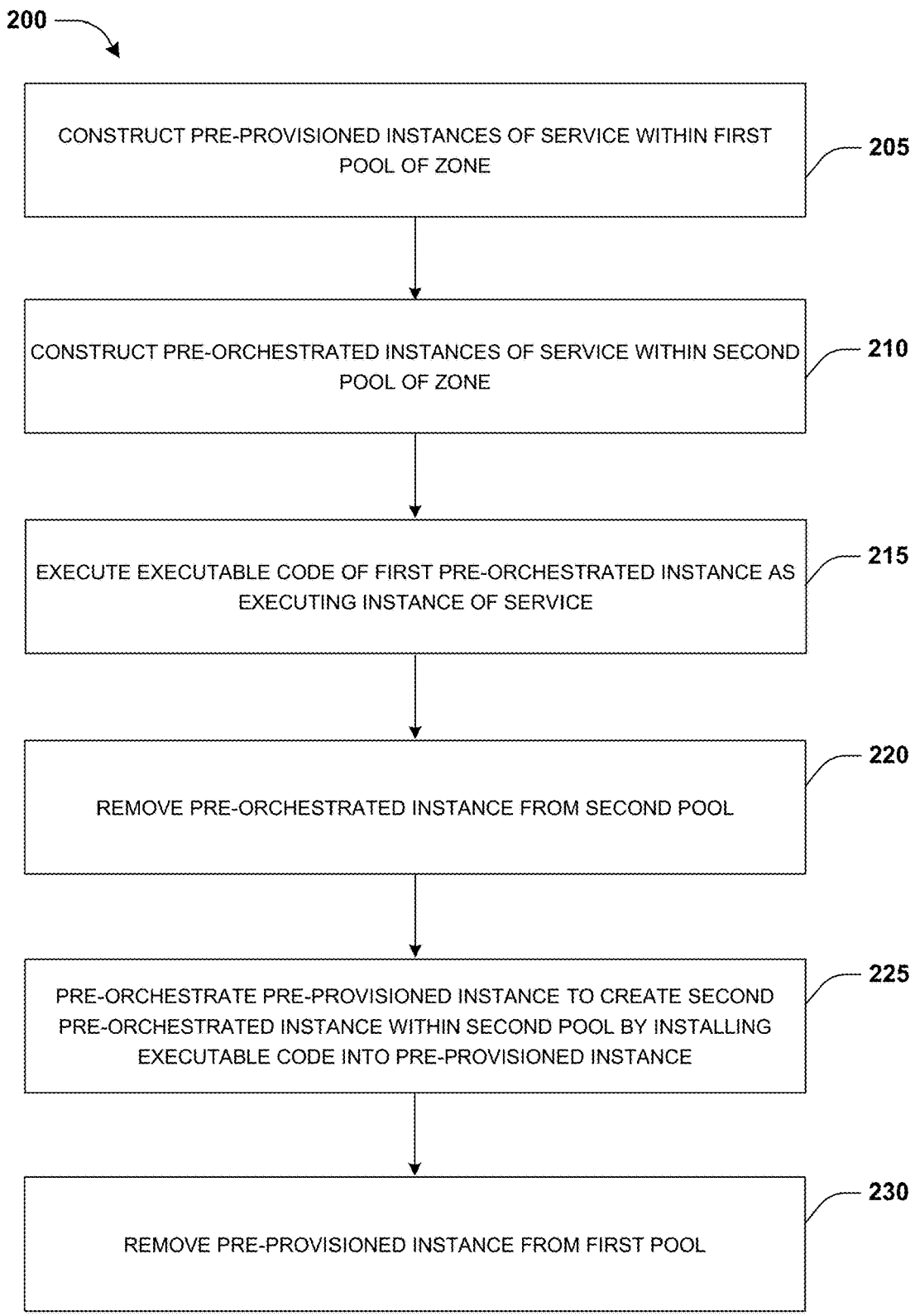
FIG. 2 illustrates an embodiment of a method associated with managing instances of services.

With reference to FIG. 2, one embodiment of a computer implemented method 200 associated with managing instances of services is illustrated. In one embodiment, the method 200 is performed by the management module 105 and system 300 of FIGS. 3A-3D utilizing various computing resources of the computer 615 of FIG. 6 or other computers. The computing resources, such as the processor 620, are used for executing instructions associated with constructing pre-provisioned instances and pre-orchestrated instances of services. Memory 635 and/or disks 655 are used for storing pre-provisioned instances, pre-orchestrated instances, and/or other data. Network hardware is used for providing remote devices with access to executing instances of the services over a network. The method 200 is triggered upon a command to host a service such as through a cloud computing environment, user initiated, or initiated by a defined time period.

Figure 3A:
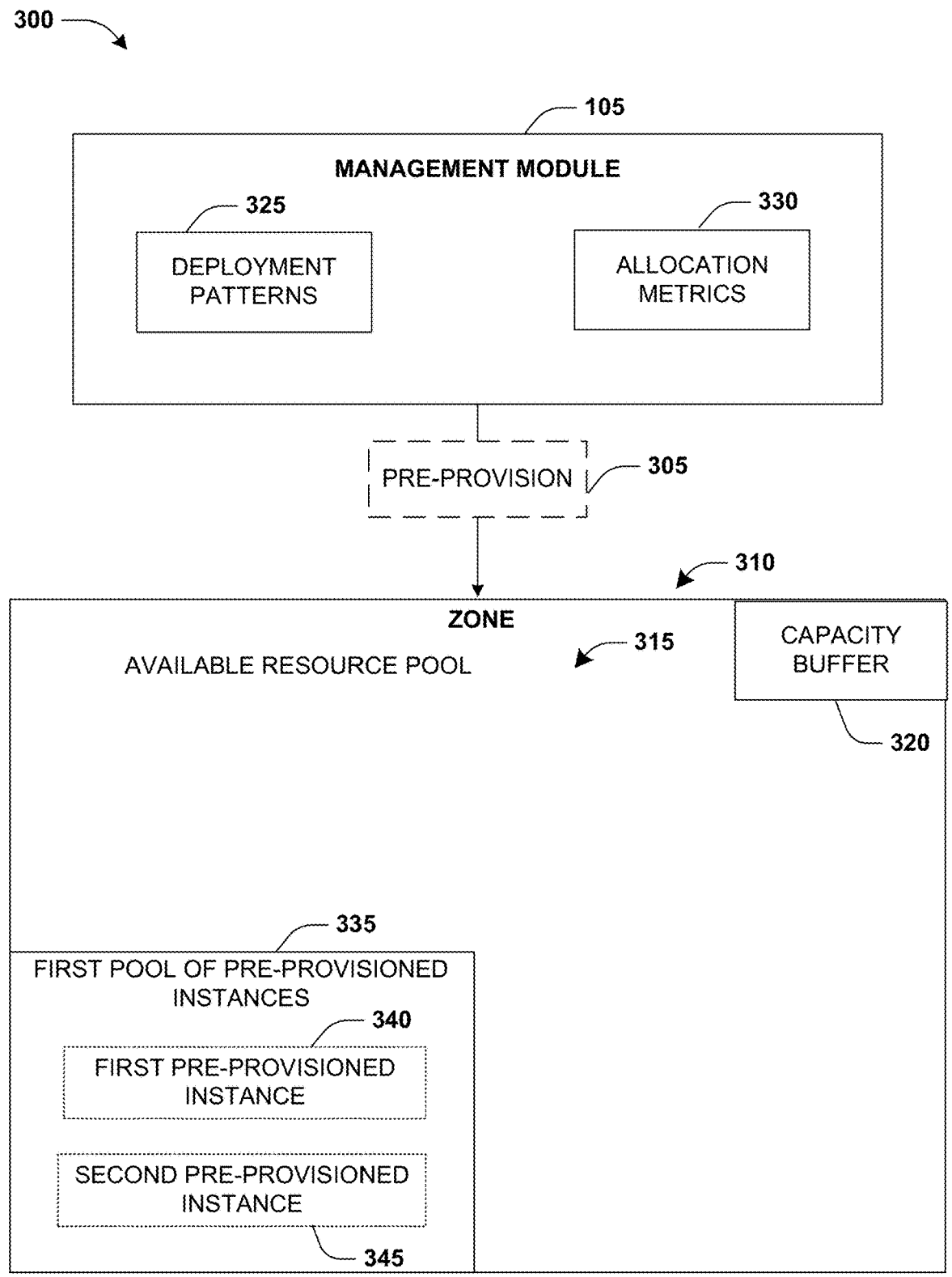
FIG. 3A illustrates an embodiment of a system associated with managing instances of services, where pre-provisioned instances are constructed.
Figure 3B:
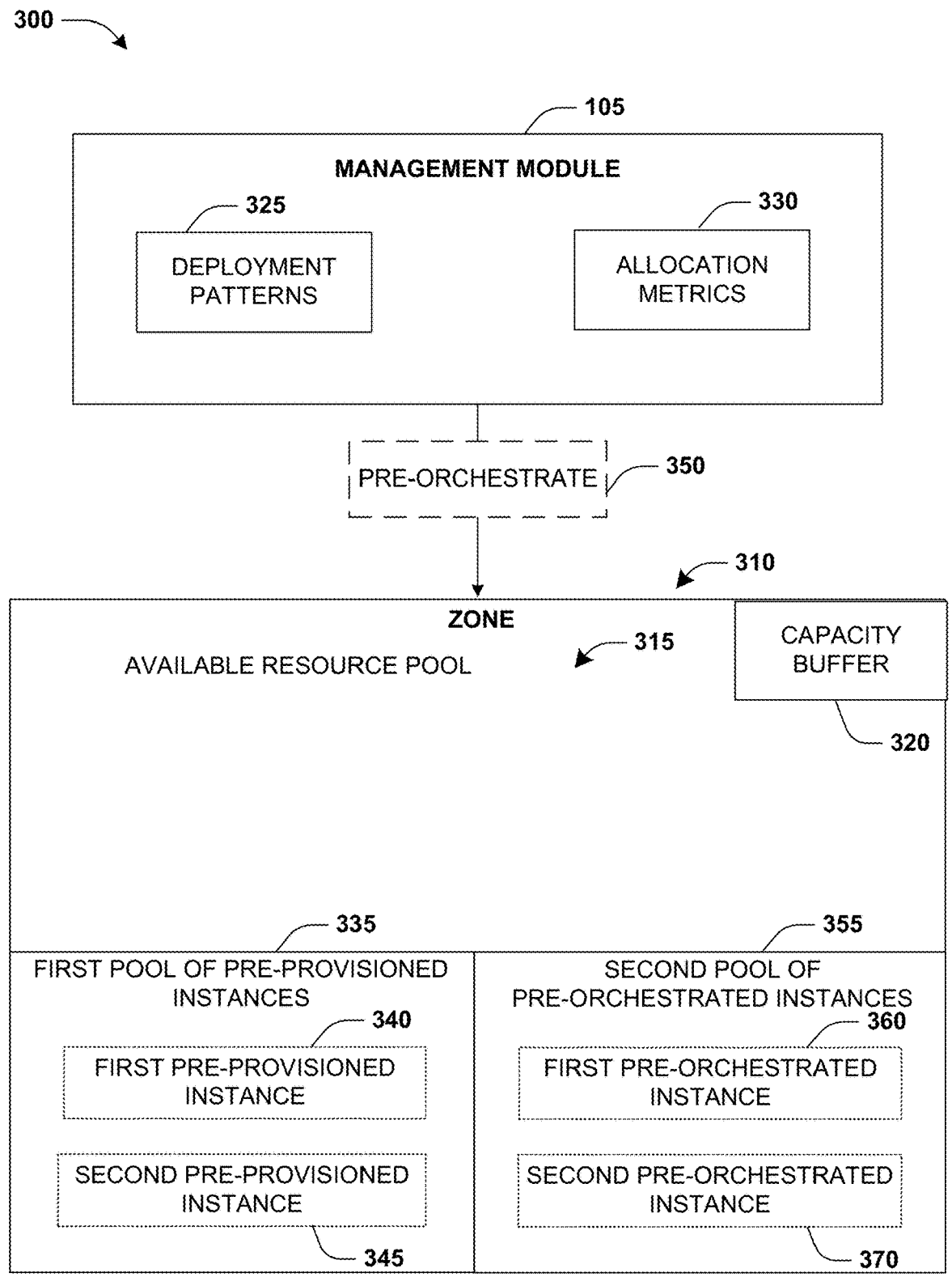
FIG. 3B illustrates an embodiment of a system associated with managing instances of services, where pre-orchestrated instances are constructed.

A plurality of zones are defined within the cloud computing environment, such as a zone 310, as illustrated by FIG. 3A. The zone 310 is constructed by creating an available resource pool 315 of computing resources. The zone 310 may be constructed in response to receiving a request to create one or more zones. In one embodiment, the zone 310 is defined to comprise certain hardware devices and/or software components, such as processors, software applications and services, database, network devices, storage devices, etc. In this way, the available resource pool 315 is constructed to comprise processor, memory, storage, network, and/or other computing resources. Such resources can be used by executing instances for executing executable code of a service. For example, an executing instance is implemented as a virtual machine with an operating system and software that is executed using available resources assigned to the virtual machine.

A capacity buffer 320 is created within the zone 310. The capacity buffer 320 is assigned available resources that are used as reserved computing resources. The reserved computing resources are not available for general execution of executing instances. Instead, the reserved computing resources are exclusively used by the management module 105, such as in the event additional computing resources are needed. The reserved computing resources can be used to expand the available resource pool 315, a first pool 335 of pre-provisioned instances, and/or a second pool 355 of pre-orchestrated instances.

In one embodiment, thresholds are specified for each type of computing resource of the zone 310. For example, thresholds are assigned to processor resources, storage resources, memory resources, and network resources such as an IP pool. If a threshold is reached or exceeded, then various actions can be taken, such as decommissioning pre-provisioned instances and/or pre-orchestrated instances to return computing resources back into the available resource pool 315.

The first pool 335 of pre-provisioned instances is created for the zone 310 and one or more pre-provisioned instances are constructed in the first pool 335, at 205 (also represented as "pre-provision" block in FIG. 3A. The first pool 335 is also created and defined by a collection of instance pointers that identify the instances belonging to (assigned to) the first pool 335. The first pool 335 is created to encompass computing resources assigned from the available resource pool 315 to pre-provisioned instances. Such pre-provisioned instances comprise a number of instances such as a first pre-provisioned instance 340, a second pre-provisioned instance 345, etc.

The first pool 335 is designated for pre-provisioned instances of a particular service, such as a cloud service. In one embodiment, the first pre-provisioned instance 340 is constructed within the first pool 335 of the zone 310 using available resources from the available resource pool 315. The available resources are assigned to the first pre-provisioned instance 340 based upon what computing resources are typically used by an instance of the cloud service. Such computing resources may be specified ahead of time by the cloud service or through a service level agreement defined for the service. For example, a particular client may require low latency, a certain amount of processing resources, etc, and be assured of those service characteristics based on a service level agreement.

In another embodiment of determining what resources to assign, the computing resources are programmatically determined. That is, the computing resources are determined based upon historic execution of instances of the cloud service. For example, an instance comprises a virtual machine that will execute the executable code of the application stack of the cloud service. An operating system of the virtual machine, the executable code of the application stack, and other applications or functionality executed by the virtual machine will consume processor, memory, storage, and network resources.

Accordingly, an amount of available computing resources is assigned to the first pre-provisioned instance 340 of the cloud service so that the first pre-provisioned instance 340 can operate and provide a level of service expected or subscribed to by corresponding clients. In this way, the first pre-provisioned instance 340 comprises a computing environment of computing resources and is made available for subsequent installation of the executable code of the cloud service. The executable code may comprise a software application or suite of software applications used to create and host applications by the cloud service.

Capacity management is provided by the management module 105 for the cloud computing environment utilizing the first pool 335 of pre-provisioned instances. In particular, the management module 105 provides capacity management by dynamically constructing and maintaining a particular number of pre-provisioned instances. In one embodiment, the management module 105 calculates deployment patterns 325 and allocation metrics 330 for the first pool 335. The deployment patterns 325 can be calculated continuously, periodically, on a set schedule, on-demand, etc. In particular, the management module 105 tracks deployment patterns 325 of instances of the service being deployed/provisioned/executed within the zone 310 or across zones. For example, the management module 105 tracks a number of executing instances of the cloud service that are executed within the zone 310. The number of executing instances can be tracked for various timespans and periods of time. In this way, the deployment patterns 325 correspond to demand for execution of the cloud service at various times and over various time intervals.

The deployment patterns 325 are used to determine a size for the first pool 335. The size corresponds to a maximum number of pre-provisioned instances that can be maintained within the first pool 335. Because the size of the first pool 335 can be dynamically modified based upon the latest deployment patterns, a current size of the first pool 335 is adjusted based upon the size determined from the deployment patterns 325. Accordingly, a larger size is designated for the first pool 335 for more frequent deployment patterns 325 so long as there are adequate available resources for executing instances. A smaller size is designated for less frequent deployment patterns. In this way, more pre-provisioned instances are assigned to and maintained within the first pool 335 when executing instances of the cloud service are frequently deployed/provisioned. Otherwise, fewer pre-provisioned instances are maintained so that computing resources can be used for other purposes, such as other pools of pre-provisioned, pre-orchestrated, or executing instances for other services.

In one embodiment, the size of a pool is controlled and adjusted by adding and/or removing instance pointers that are stored in the collection of instance pointers of the pool (e.g., the pointer list for the pool). The number of pointers in the collection identifies the number of instances assigned to the pool. When a pointer is removed from the pointer list, the corresponding instance is thus removed from the pool.

In another embodiment of capacity management, the management module 105 calculates allocation metrics 330 for the first pool 335. An allocation metric specifies a minimum number of pre-provisioned instances that are to be maintained within the first pool 335. The minimum number of pre-provisioned instances is specified as an exhaustion threshold of the allocation metrics 330. If the number of pre-provisioned instances is below the exhaustion threshold, then a pool recovery procedure is performed to replenish the first pool 335. The first pool 335 is replenished by constructing one or more pre-provisioned instances within the first pool 335. The first pool 335 is replenished until the number of pre-provisioned instances within the first pool 335 exceeds the exhaustion threshold.

In one embodiment, available resources from the available resource pool 315 are used to construct the pre-provisioned instances. However, if there are not adequate available resources, then computing resources from the capacity buffer 320 can be used. Or, a stop command is implemented to stop provisioning new instances of the cloud service until the available resource pool 315 has a threshold amount of available computing resources to use for replenishing the first pool 335. Computing resource will become available as executing instances are decommissioned, such as after the executing instances have completed their tasks. The computing resources can also become available as executing instances are no longer being accessed or used by remote devices through the cloud computing environment. In another embodiment where there are not enough available resources for replenishment, an alert is transmitted over a network to a remote device that the first pool 335 is exhausted.

Demand for the cloud service is monitored over time. The management module 105 monitors the demand based upon how many remote devices request access to the service at various times and over various time periods. Trend analysis is performed upon the demand to determine a shift in demand for the service. If the shift is an increase in demand for the service, then the minimum number of pre-provisioned instances specified by the allocation metrics 330 is increased. In this way, increasing future demand for the service can be fulfilled more quickly and efficiently by using available pre-provisioned instances instead of from scratch otherwise due to an inadequate amount of pre-provisioned instances.

Pre-provisioned instances are proactively constructed with computing environments of allocated computing resources, which is time consuming. Thus, using pre-provisioned instances to provision executing instances of the service is quicker and more efficient than creating executing instances from scratch. If the shift is a decrease in demand for the service, then the minimum number of pre-provisioned instances specified by the allocation metric is decreased. This allows available computing resources to be used for other purposes and/or services. In this way, pre-provisioned instances can be decommissioned as part of capacity management to free up computing resources.

With continued reference to FIG. 2, at 210, a second pool 355 of pre-orchestrated instances is created for the zone 310, which includes at least defining a data structure for a collection of instance pointers (e.g. a pointer list) for the second pool 355. The collection of instance pointers identify which instances are part of the second pool 355. One or more pre-orchestrated instances are constructed in the second pool 355 (also represented by "Pre-Orchestrate" block 350 in FIG. 3B). The second pool 355 is created to encompass pre-orchestrated instances of a particular service, such as the cloud service. Such pre-orchestrated instances comprise a number of instances such as a first pre-orchestrated instance 360, a second pre-orchestrated instance 370, etc. as illustrated examples in pool 355 in FIG. 3B.

In one embodiment, the first pre-orchestrated instance 360 is created by retrieving and installing the executable code of the cloud service into a pre-provisioned instance selected from the first pool 355. The pre-provisioned instance is removed from the first pool 335 by removing its corresponding pointer from the collection of pointers of the first pool 335 and adding the pointer to the second pool's collection of pointers. The first pre-orchestrated instance 360 is created as part of the second pool 355. The executable code is installed in a non-execution state, and is not executed until the first pre-orchestrated instance 360 is provisioned and assigned to a customer as an executing instance of the cloud service.

Constructing the pre-provisioned instance is time consuming, which can take minutes to hours depending on load of the zone 310 and the cloud computing environment. Installing the executable code takes a significantly shorter amount of time, and thus pre-orchestrated instances can be quickly and efficiently constructed from the pre-provisioned instances. In this way, the pre-orchestrated instances are ready to provision as executing instances of the cloud service in little to no time because the computing environment and executable code merely need to be executed. This greatly improves the operation of the cloud computing environment because executing instances of the cloud service can be quickly provisioned from the pre-orchestrated instances. This minimizes the delay in service availability to a client device due to provisioning when the client device requests access to the cloud service.

Capacity management is provided by the management module 105 for the cloud computing environment utilizing the second pool 355 of pre-orchestrated instances. In particular, the management module 105 provides capacity management by dynamically constructing and maintaining a particular number of pre-orchestrated instances. In one embodiment, the management module 105 calculates the deployment patterns 325 and the allocation metrics 330 for the second pool 355. The deployment patterns 325 and the allocation metrics 330 are used by the management module 105 to maintain certain numbers of pre-provisioned instances and pre-orchestrated instances.

The deployment patterns 325 of instances of the service being deployed/provisioned are tracked by the management module 105. The deployment patterns 325 are used to determine a second size for the second pool 355. The second size corresponds to a maximum number of pre-orchestrated instances that can be maintained within the second pool 355. Because the size of the second pool 355 can be dynamically modified based upon the latest deployment patterns, a current size of the second pool 355 is adjusted based upon the second size determined from the deployment patterns 325. Accordingly, a larger size is designated for the second pool 355 for more frequent deployment patterns 325 so long as there are available resources for executing instances. A smaller size is designated for less frequent deployment patterns.

In this way, more pre-orchestrated instances can be maintained within the second pool 355 when executing instances of the cloud service are frequently deployed/provisioned. Otherwise, fewer pre-orchestrated instances are maintained so that computing resources can be used for other purposes, such as other pools of pre-provisioned, pre-orchestrated, or executing instances of other services. In one embodiment, the second size of the second pool 355 is constrained to a value that is fewer than the size of the first pool 335.

In another embodiment of sizing the second pool 355, the second size is determined based upon a count of executing instances of the cloud service and a historic error rate. The more executing instances of the cloud service, the greater the demand for the cloud service. Thus, the second size is determined to have a larger value than if the count of executing instances was smaller. The historic error rate may correspond to errors of executing instances, and thus the second size should be higher to ensure availability of pre-orchestrated instances to take over for failed executing instances.

In another embodiment of capacity management, the management module 105 calculates allocation metrics 330 for the second pool 355, such as based upon statistics and heuristics. An allocation metric specifies a minimum number of pre-orchestrated instances that are to be maintained within the second pool 355. The minimum number of pre-orchestrated instances is specified as an exhaustion threshold of the allocation metrics 330. If the number of pre-orchestrated instances is below the exhaustion threshold, then a pool recovery procedure is performed to replenish the second pool 355. The second pool 355 is replenished by constructing one or more pre-orchestrated instances within the second pool 355. The pre-orchestrated instances are constructed by retrieving and installing the executable code into pre-provisioned instances from the first pool 335. The second pool 355 is replenished until the number of pre-orchestrated instances within the second pool 355 exceeds the exhaustion threshold.

Demand for the cloud service is monitored over time. The management module 105 monitors the demand based upon how many remote devices request access to the service at various times and over various time periods. Trend analysis is performed upon the demand to determine a shift in demand for the service. If the shift is an increase in demand for the service, then the minimum number of pre-orchestrated instances specified by the allocation metrics 330 is increased. In this way, increasing future demand for the service can be fulfilled more quickly and efficiently because an adequate number of pre-orchestrated instances is proactively maintained within the second pool 355. The speed and efficiency of deploying/provisioning executing instances of the service is improved because the computing environment and executable code are already part of the pre-orchestrated instances. Executing the computing environment and executable code takes little to no time. If the shift is a decrease in demand for the service, then the minimum number of pre-orchestrated instances specified by the allocation metric is decreased. This allows available computing resources to be used for other purposes and/or services.

Thus, pre-orchestrated instances can be decommissioned as part of capacity management to free up computing resources.

Once the first pool 335 of pre-provisioned instances and the second pool 355 of pre-orchestrated instances are created, the management module 105 can utilize the pools for fulfilling requests for the service. At some point, the management module 105 receives a request from customer via a remote device that is requesting access to the service, as represented by block "Request for Service" 373 hereinafter request 373 in FIG. 3C. In one embodiment, a client may utilize the remote device to access a cloud environment provided by the cloud service of the cloud computing environment. The request 373 may be received from the remote device by a routing tier of the cloud computing environment. The routing tier may comprise networking hardware, software, and/or protocol functionality for routing information such as data packets between remote devices and servers of the cloud computing environment. The routing tier routes the request 373 to the management module 105. The management module 105 may determine that the second pool 355 comprises pre-orchestrated instances of the cloud environment, such as the first pre-orchestrated instance 360, which can be used to satisfy the request 373.

In one embodiment, the management module 105 queues requests for execution of services within a queue. The management module 105 utilizes a policy to determine how to implement requests within the queue (e.g., enqueue/dequeue, locks/semaphores, etc.). The policy specifies constraints on implementing requests, which are used to prevent deadlocks between the requests for services. In particular, the constraints are used to prevent the execution of two instances that would otherwise be in a deadlock state due to both of the instances waiting for the same resource of the zone 310. Thus, the constraints are used to determine when to dequeue and execute the two instances at different times to prevent the deadlock state. It may be appreciated that other techniques could be utilized, such as a delay mechanism that creates delays by enforcing serial execution of requests or other techniques that could be implemented by pol managers with concurrent control such as based upon real-time pool management patterns.

Figure 3C:
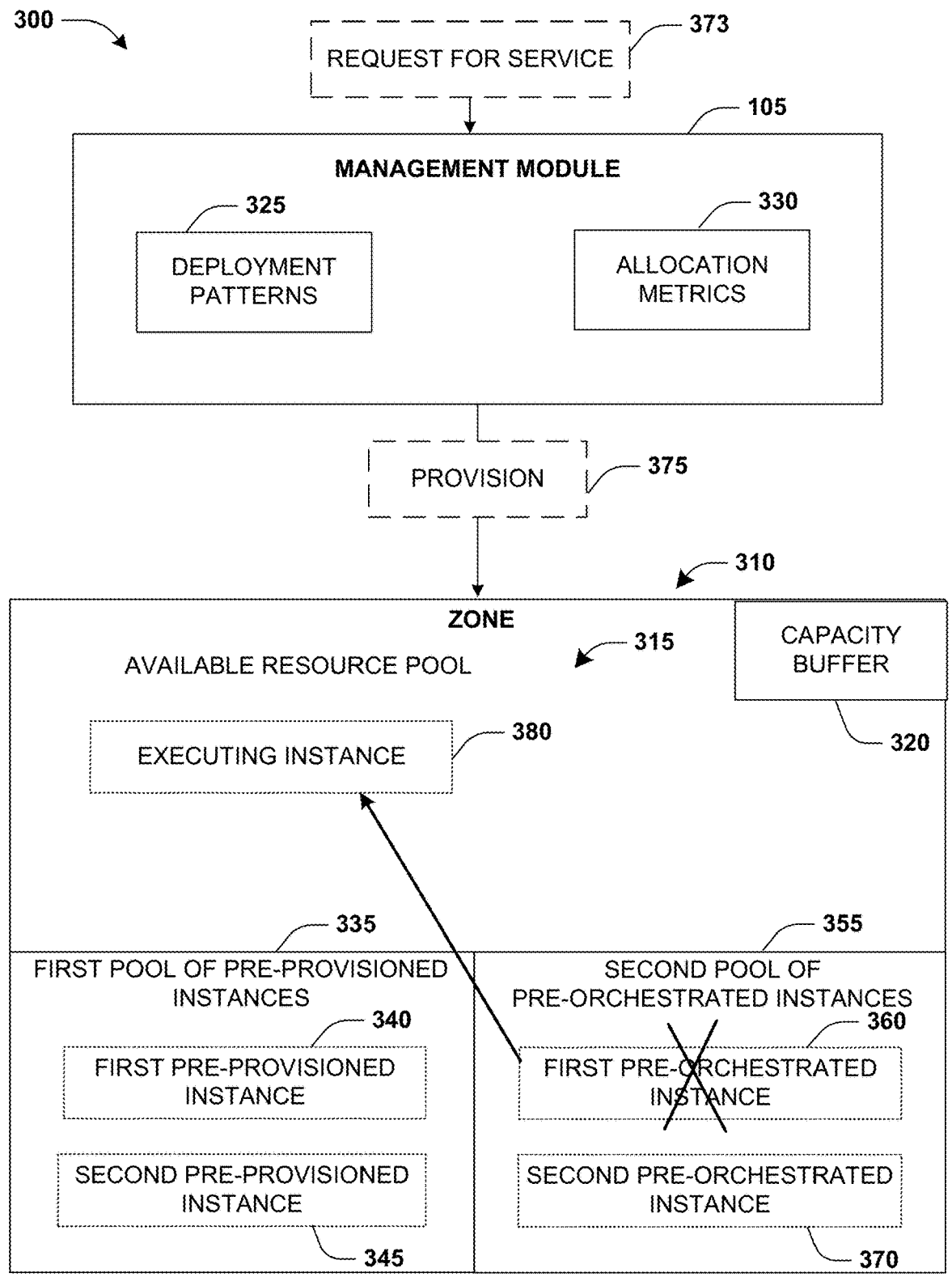
FIG. 3C illustrates an embodiment of a system associated with managing instances of services, where an executing instance is provisioned.

At 215 in method 200 of FIG. 2, in response to receiving the request for service, the management module 105 provisions the first pre-orchestrated instance 360 from the second pool 355 as an executing instance 380 of the cloud service. This is also represented by block "Provision" 375 in FIG. 3C and includes assigning the executing instance to the requesting customer. The first pre-orchestrated instance 360 is provisioned by executing the computing environment and executable code of the first pre-orchestrated instance 360. For example, a virtual machine of the computing environment is instantiated to execute an operating system of the virtual machine and an application stack of the cloud service. Once provisioned 375, the first pre-orchestrated instance 360 is removed from the second pool 355, which is block 220 in FIG. 2. Removing the instance includes removing its corresponding pointer from the collection of pointers of the second pool 355. The removed instance 360 is shown in FIG. 3C with the "X" through its block and an arrow to the instance it becomes after provisioning, namely, the executing instance 380.

In one embodiment, computing resources of the zone 310 and/or client data maintained within a data tier of the cloud computing environment are locked. The computing resources and client data are locked so that only the executing instance 380 has access to them. Thus, other executing instances are blocked from accessing the computing resources and client data. This prevents resource starvation, deadlocks, or inconsistencies in client data from multiple executing instances otherwise accessing the same computing resources and client data.

Figure 3D:
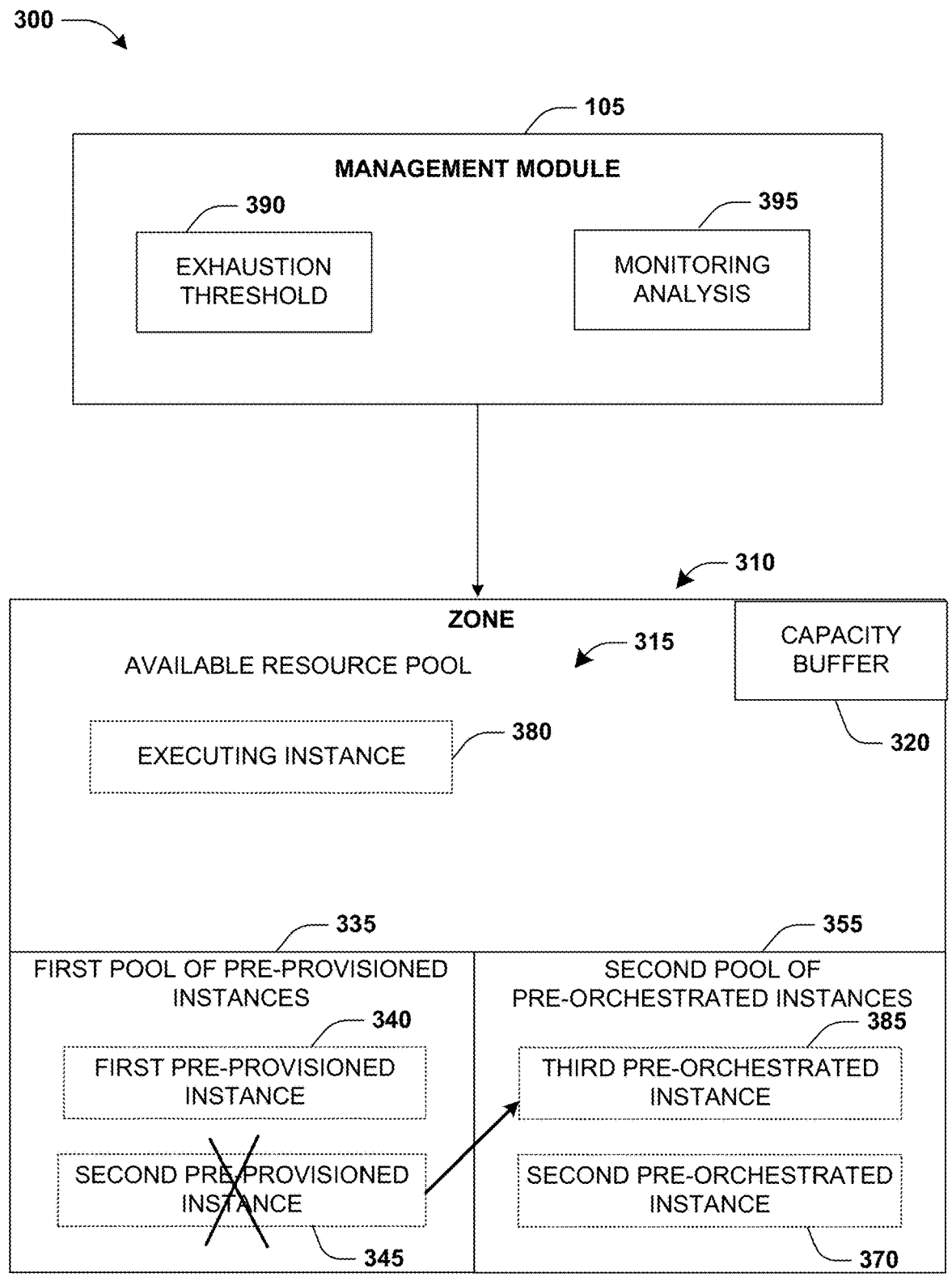
FIG. 3D illustrates an embodiment of a system associated with managing instances of services, where a first pool of pre-provisioned instances and a second pool of pre-orchestrated instances are monitored and managed.

With continued reference to FIG. 2, at 225, a pre-provisioned instance from the first pool 335 is selected and pre-orchestrated to create an pre-orchestrated instance within the second pool 355 to replace the first pre-orchestrated instance 360 that was removed, as illustrated by FIG. 3D. For example, the second pre-provisioned instance 345 from the first pool 335 is selected and pre-orchestrated, which becomes a third pre-orchestrated instance 385 which is assigned to the second pool 355. The second pre-provisioned instance is pre-orchestrated by retrieving and installing the executable code of the cloud service into the second pre-provisioned instance 345. The executable code is installed in a non-executing state, and will be executed during subsequent provisioning.

At 230, the second pre-provisioned instance 345 is removed from the first pool 335. This function involves moving instance pointers. The instance pointer of the second pre-provisioned instance 345 is removed from the collection of pointers for the first pool 335 and the instance pointer is added to the pointer list of the second pool 355.

In one embodiment, a second request for service of the cloud service may be received. The management module 105 evaluates the second pool 355 to determine whether there are any pre-orchestrated instances within the second pool 355. In one embodiment, the determination is performed by determining if there are any instance pointers in the collection of pointers (pointer list) for the second pool 355. If no pointers are in the pointer list, then no instances are currently assigned to the second pool 355. In response to determining that there are no pre-orchestrated instances or less than an exhaustion threshold 390 number of pre-orchestrated instances, one or more pre-provisioned instances from the first pool 335 are pre-orchestrated and assigned to the second pool 355. The pre-provisioned instances are pre-orchestrated to create pre-orchestrated instances within the second pool 355 to replenish the second pool 355. Their corresponding instance pointers are removed from the pointer list of the first pool and added to the pointer list of the second pool. The second pool 355 is replenished to have more than the exhaustion threshold 390 number of pre-orchestrated instances. In this way, one or more pre-orchestrated instances from the second pool 355 are made to be available and thus can be used to process the second request.

In one embodiment, capacity management is provided by decommissioning executing instances, pre-orchestrated instances, and/or pre-provisioned instances. Such instances can be decommissioned to release computing resources back into the available resource pool 315. Thus, these computing resources can be used for other purposes, such as for a different service. For example, pre-provisioned instances are decommissioned from the first pool 335 of the cloud service so that the computing resources can be used in other pools of pre-provisioned instances of other services hosted within the zone 310. In another example, a decommission command is received for the executing instance 380, such as where the remote device is no longer accessing the service. A virtual machine hosting the executing instance 380 using the computing resources of the zone 310 is decommissioned. The computing resources are assigned back to the available resource pool 315 for other purposes.

In one embodiment, capacity management is provided by monitoring demand 395 for executing instances of the service. Performance trend analysis is performed upon the demand to determine a shift in demand for the service. Predictive analysis is performed upon the shift in demand to determine a projection that computing resource of the zone 310 or a data center hosting the zone 310 will become exhausted. Accordingly, an alert of the projection is transmitted over a network to a computer.

Providing capacity management for the cloud computing environment improves operation of computers hosting the cloud computing environment and remote devices relying upon access to services. Constructing the computing environment and installing the executable code can take a significant amount of time and resources. Thus, these tasks are proactively performed ahead of time before there is demand for services. Executing the executable code within the pre-orchestrated instances to create the executing instances takes little to no time. Thus, when requests for a service are received, any number of pre-orchestrated instances can be quickly and efficiently provisioned as executing instances. This greatly improves the operation of computers of the cloud computing environment and client computers relying upon access to the service. The ability to quickly provision any number of executing instances reduces the delay in service availability to a client device where the delay is caused by the provisioning process that the client device would otherwise experience in waiting for executing instances to be constructed from scratch.

Figure 4:
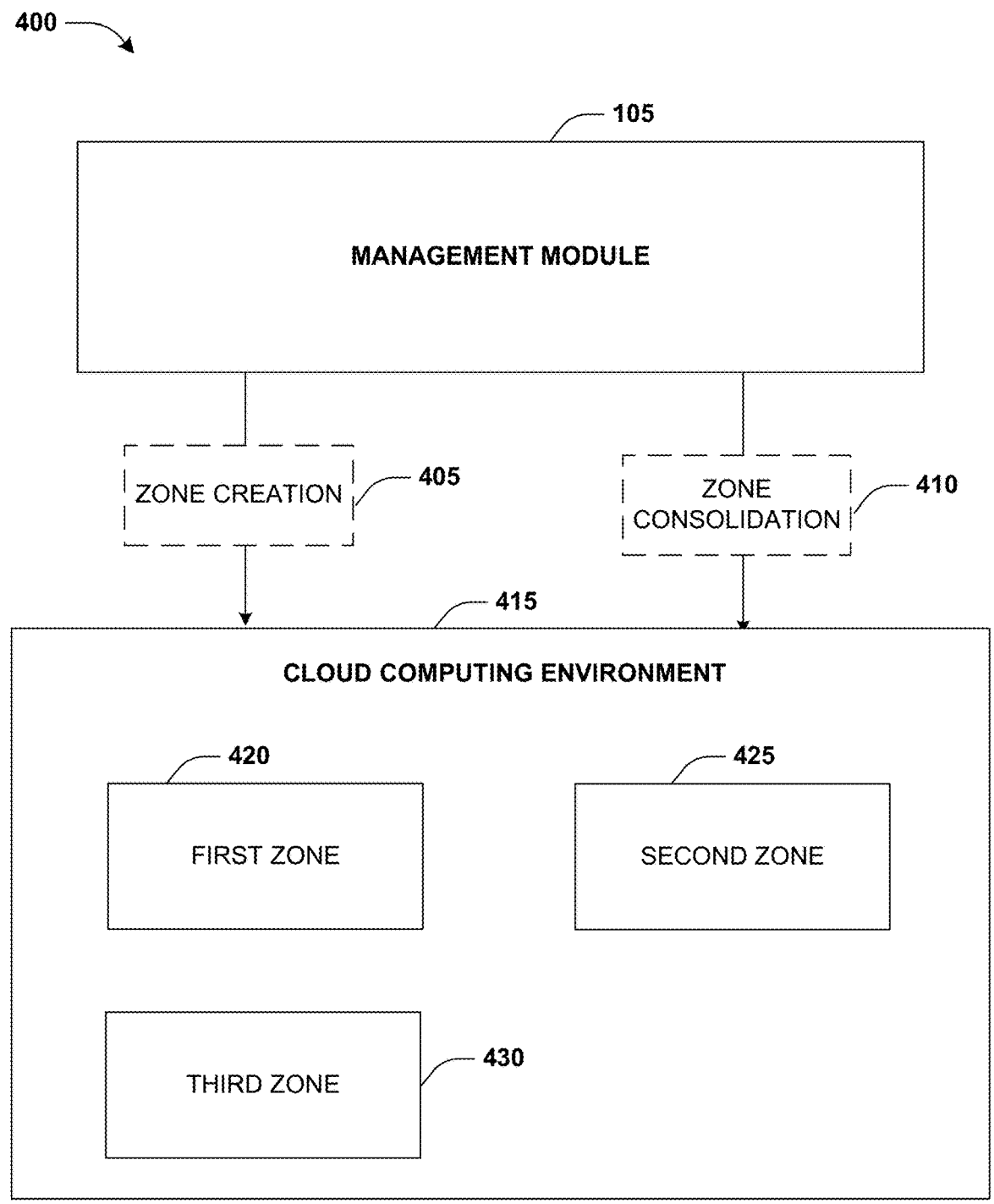
FIG. 4 illustrates an embodiment of a system associated with managing instances of services, where a plurality of zones are managed.

FIG. 4 illustrates a system 400 for providing capacity management across zones of a cloud computing environment 415. For example, a first zone 420, a second zone 425, a third zone 430, and/or other zones are defined within the cloud computing environment 415. The zones are defined as physical or logical entities having computing resources capable of executing instances of services. The zones and their respective computing resources are separated from one another. Accordingly, operation of the cloud computing environment 415 is improved by load balancing services across zones and managing the execution of instances across the zones. In this way, zones are created 405 and managed by the management module 105.

In one embodiment, the management module 105 hosts executing instances of services within the plurality of zones, such as zones within a data center. The management module 105 monitors resource utilization by the executing instances. The management module 105 may identify one or more zones, such as the third zone 430, as having resource utilization below a threshold. For example, merely a small number of executing instances are hosted by the third zone 430, and thus the third zone 430 has a substantial amount of unused available resources. In one embodiment, executing instances within other zones are migrated to the third zone 430 by provisioning pre-orchestrated instances within the third zone 430 as executing instances of services that are being migrated to the third zone 430. In another embodiment, the management module 105 performs zone consolidation 410 by migrating the executing instances from the third zone 430 to other zones. The third zone is then decommissioned so that its computing resources can be used by other zones for other purposes.

Figure 5:
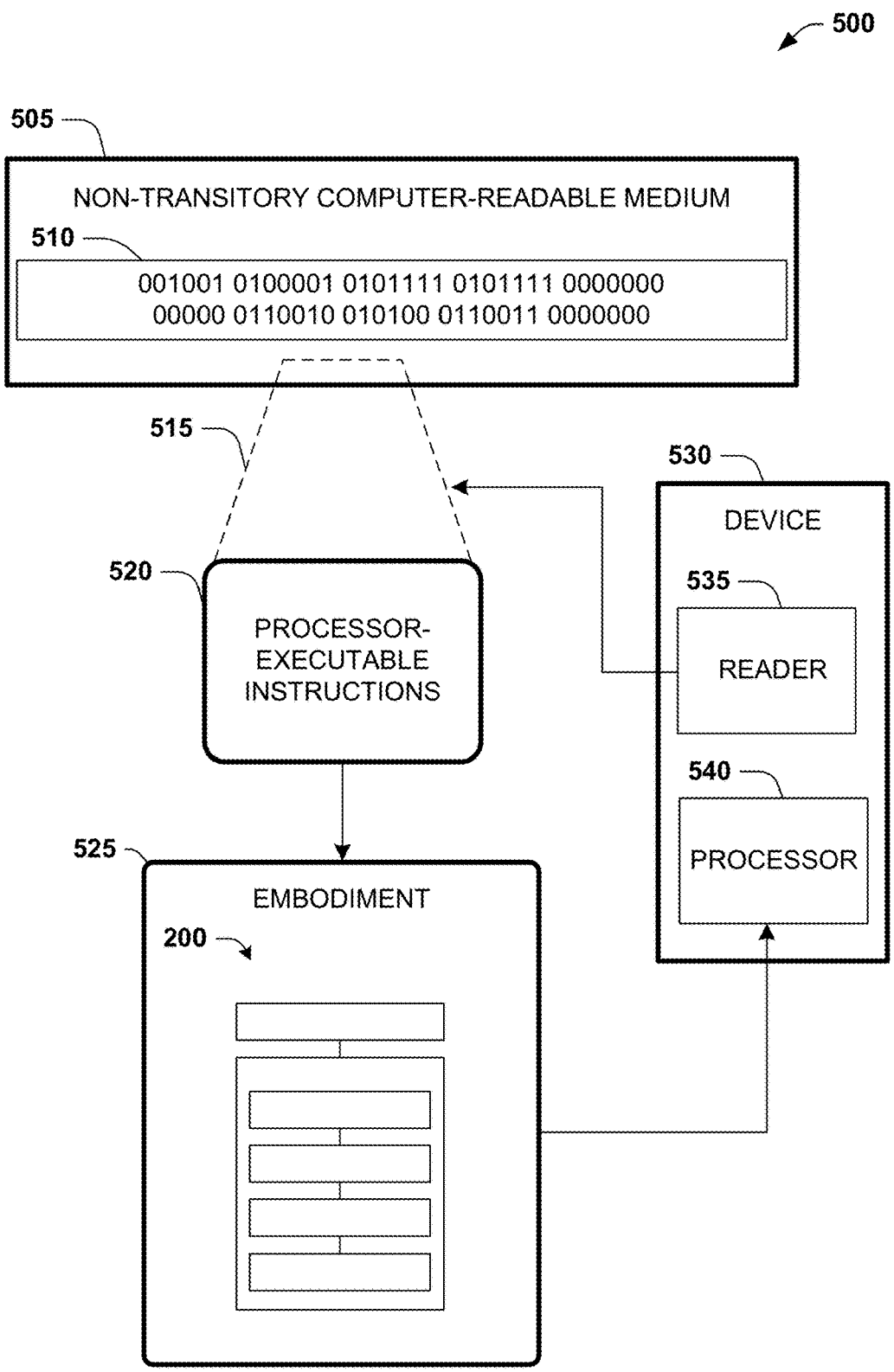
FIG. 5 illustrates an embodiment of a non-transitory computer-readable medium.

FIG. 5 is an illustration of a configuration 500 involving a programmed non-transitory computer-readable medium 505. In one embodiment, one or more of the components described herein are configured as program modules, such as the management module 105, stored in the non-transitory computer-readable medium 505. The program modules are configured with stored instructions, such as processor-executable instructions 520, that when executed by at least a processor, such as processor 540, cause the computing device to perform the corresponding function(s) as described herein. In one embodiment, the functionality of the management module 105, stored in the non-transitory computer-readable medium 505, may be executed by the processor 540 as the processor-executable instructions 520 to perform an embodiment 525 of the method 200 of FIG. 2.

The non-transitory computer-readable medium 505 includes the processor-executable instructions 520 that when executed by a processor 540 cause performance of at least some of the provisions herein. The non-transitory computer-readable medium 505 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, a solid-state drive, or a magnetic or optical disc (such as a compact disk (CD), a digital versatile disk (DVD), or floppy disk). The example non-transitory computer-readable medium 505 stores computer-readable data 510 that, when subjected to reading 515 by a reader 535 of a device 530 (e.g., a read head of a hard disk drive, or a read operation invoked on a solid-state storage device), express the processor-executable instructions 520.

In some embodiments, the processor-executable instructions 520, when executed cause performance of operations, such as at least some of the example method 200 of FIG. 2, for example. In some embodiments, the processor-executable instructions 520 are configured to cause implementation of a system, such as at least some of the example system 100 of FIG. 1, for example.

Figure 6:
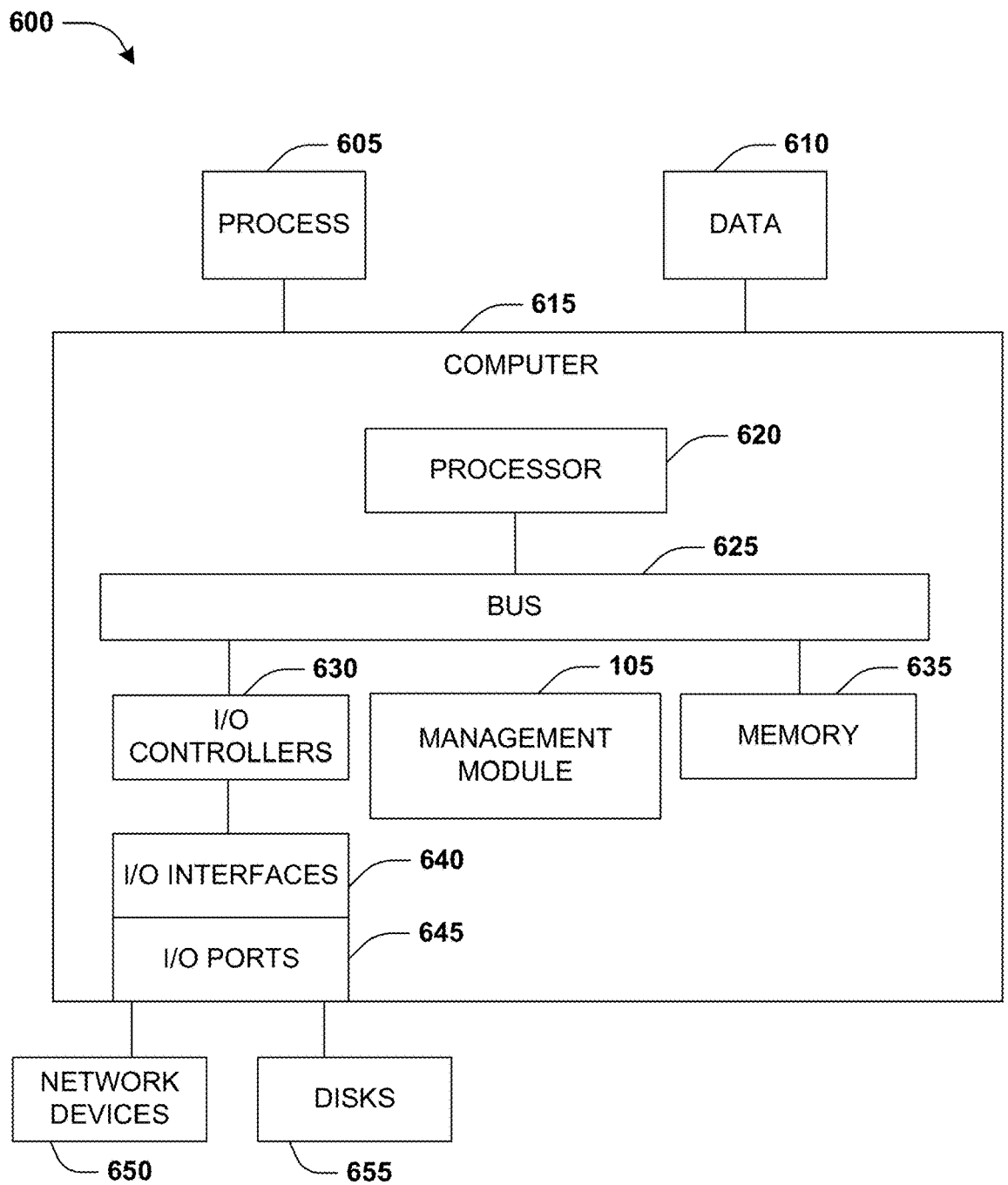
FIG. 6 illustrates an embodiment of a computing system configured with the example systems and/or methods disclosed.

FIG. 6 illustrates one embodiment of a custom configured computing device 600 that is configured and/or programmed with one or more of the example systems and methods described herein, and/or equivalents. The computing device 600 may be the computer 615 that includes a programmed processor 620, a memory 635, and I/O ports 645 operably connected by a bus 625. In one embodiment, the computer 615 may include logic of the management module 105 configured to facilitate the system 100 and/or the method 200 shown in FIGS. 1-2. In different embodiments, the logic of the management module 105 may be implemented in hardware, a non-transitory computer-readable medium 605 with stored instructions, firmware, and/or combinations thereof. While the logic of the management module 105 is illustrated as a hardware component, it is to be appreciated that in other embodiments, the logic of the management module 105 could be implemented in the processor 620, stored in memory 635, or stored in disk 655.

In one embodiment, logic of the management module 105 or the computer 615 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 615 as data 610 that are temporarily stored in memory 635 and then executed by processor 620.

The logic of the management module 105 may also provide means (e.g., hardware, non-transitory computer-readable medium 605 that stores executable instructions, firmware) for performing rule based source sequencing for allocation.

Generally describing an example configuration of the computer 615, the processor 620 may be a variety of various processors including dual microprocessor and other multi-processor architectures. The memory 635 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 655 may be operably connected to the computer 615 via, for example, the I/O interface 640 (e.g., card, device) and the I/O ports 645. The disks 655 may be, for example, a magnetic disk drive, a solid state disk drive, a floppy disk drive, a tape drive, a Zip drive, a flash memory card, a memory stick, and so on. Furthermore, the disks 655 may be a CD-ROM drive, a CD-R drive, a CD-RW drive, a DVD ROM, and so on. The memory 635 can store a process, such as within the non-transitory computer-readable medium 605, and/or data 610, for example. The disk 655 and/or the memory 635 can store an operating system that controls and allocates resources of the computer 615.

The computer 615 may interact with input/output (I/O) devices via the I/O interfaces 640 and the I/O ports 645. The I/O devices may be, for example, a keyboard, a microphone, a pointing and selection device, cameras, video cards, displays, the disks 655, the network devices 650, and so on. The I/O ports 645 may include, for example, serial ports, parallel ports, and USB ports. I/O controllers 630 may connect the I/O interfaces 640 to the bus 625.

The computer 615 can operate in a network environment and thus may be connected to the network devices 650 via the I/O interfaces 640, and/or the I/O ports 645. Through the network devices 650, the computer 615 may interact with a network. Through the network, the computer 615 may be logically connected to remote devices (e.g., the computer 615 may reside within a distributed computing environment to which clients may connect). Networks with which the computer 615 may interact include, but are not limited to, a local area network (LAN), a new area network (WAN), and other networks.

Figure 7:
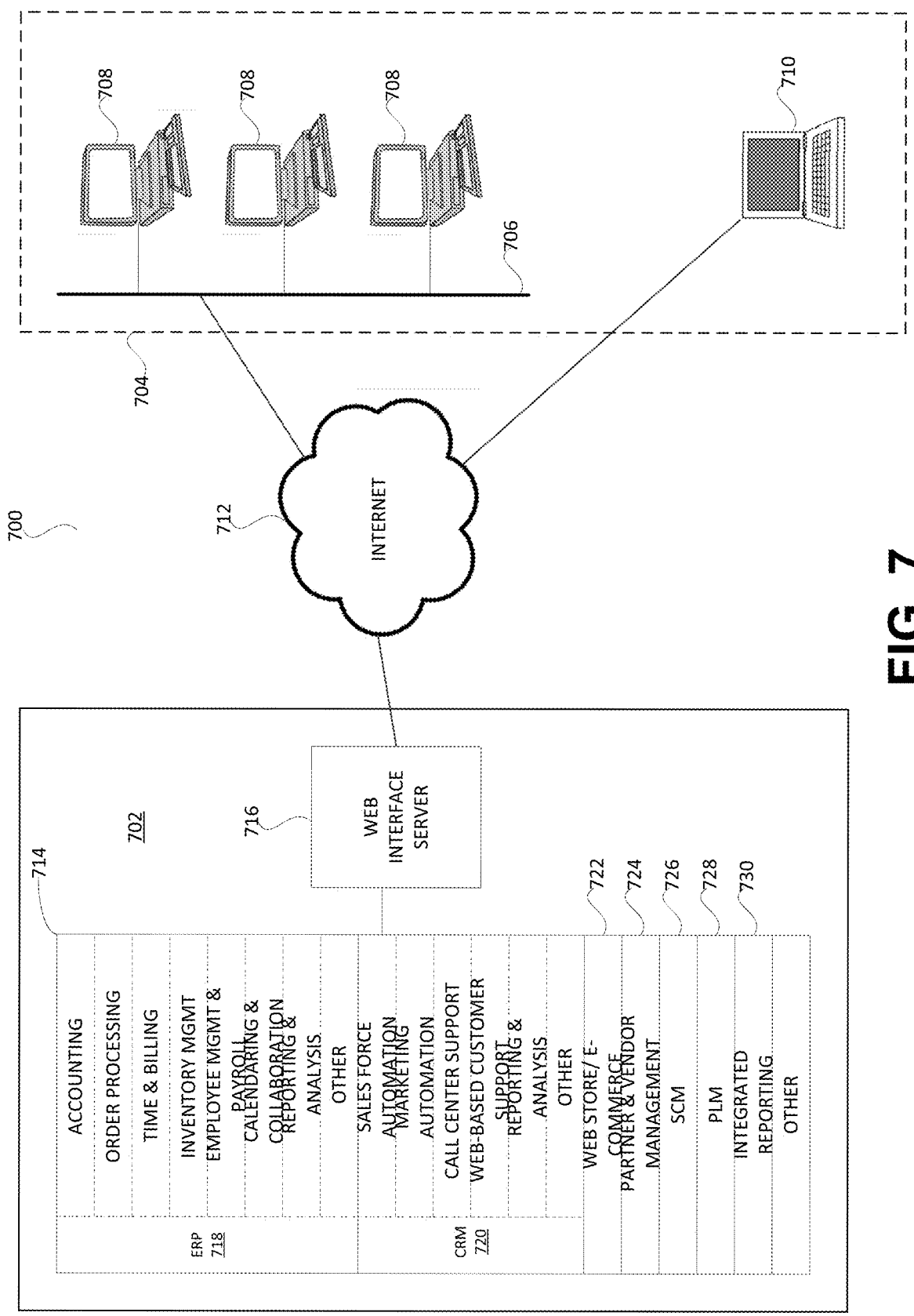
FIG. 7 illustrates an embodiment of an integrated business system and an enterprise network in which an embodiment of the invention may be implemented.

FIG. 7 is a diagram illustrating a system 700 in which an embodiment of the present system may be implemented. Enterprise network 704 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 704 is represented by an on-site local area network 706 to which a plurality of personal computers 708 are connected, each generally dedicated to a particular end user, such as a service agent or other employee (although such dedication is not required), along with an exemplary remote user computer 710 that can be, for example, a laptop computer or tablet computer of a traveling employee having internet access through a public Wi-Fi access point, or other internet access method. The end users (consumers) associated with computers 708 and 710 may possess an internet-enabled smartphone or other electronic device (such as a PDA, tablet, laptop computer) having wireless internet access or other synchronization capabilities. Users of the enterprise network 704 interface with the integrated business system 702 across the Internet 712 or another suitable communications network or combination of networks.

Integrated business system 702, which may be hosted by a dedicated third party, may include an integrated business server 714 and a web interface server 716, coupled as shown in FIG. 7. It is to be appreciated that either or both of the integrated business server 714 and the web interface server 716 may be implemented on one or more different hardware systems and components, even though represented as singular units in FIG. 7.

In a typical example in which system 702 is operated by a third party for the benefit of multiple account owners/tenants, each of whom is operating a business, integrated business server 714 comprises an ERP module 718 and further comprises a CRM module 720. In many cases, it will be desirable for the ERP module 718 to share methods, libraries, databases, subroutines, variables, etc., with CRM module 720, and indeed ERP module 718 may be intertwined with CRM module 720 into an integrated Business Data Processing Platform (which may be single tenant, but is typically multi-tenant).

The ERP module 718 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 720 may include, but is not limited to, a sales force automation (SFA) module, a marketing automation module, a contact list module (not shown), a call center support module, a web-based customer support module, a reporting and communication module, and other CRM-related modules.

The integrated business server 714 (or multi-tenant data processing platform) further may provide other business functionalities including a web store/eCommerce module 722, a partner and vendor management module 724, and an integrated reporting module 730. An SCM (supply chain management) module 726 and PLM (product lifecycle management) module 728 may also be provided. Web interface server 716 is configured and adapted to interface with the integrated business server 714 to provide one or more web-based user interfaces to end users of the enterprise network 704.

The integrated business system shown in FIG. 7 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote devices, and the software applications running on the remote devices, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 8:
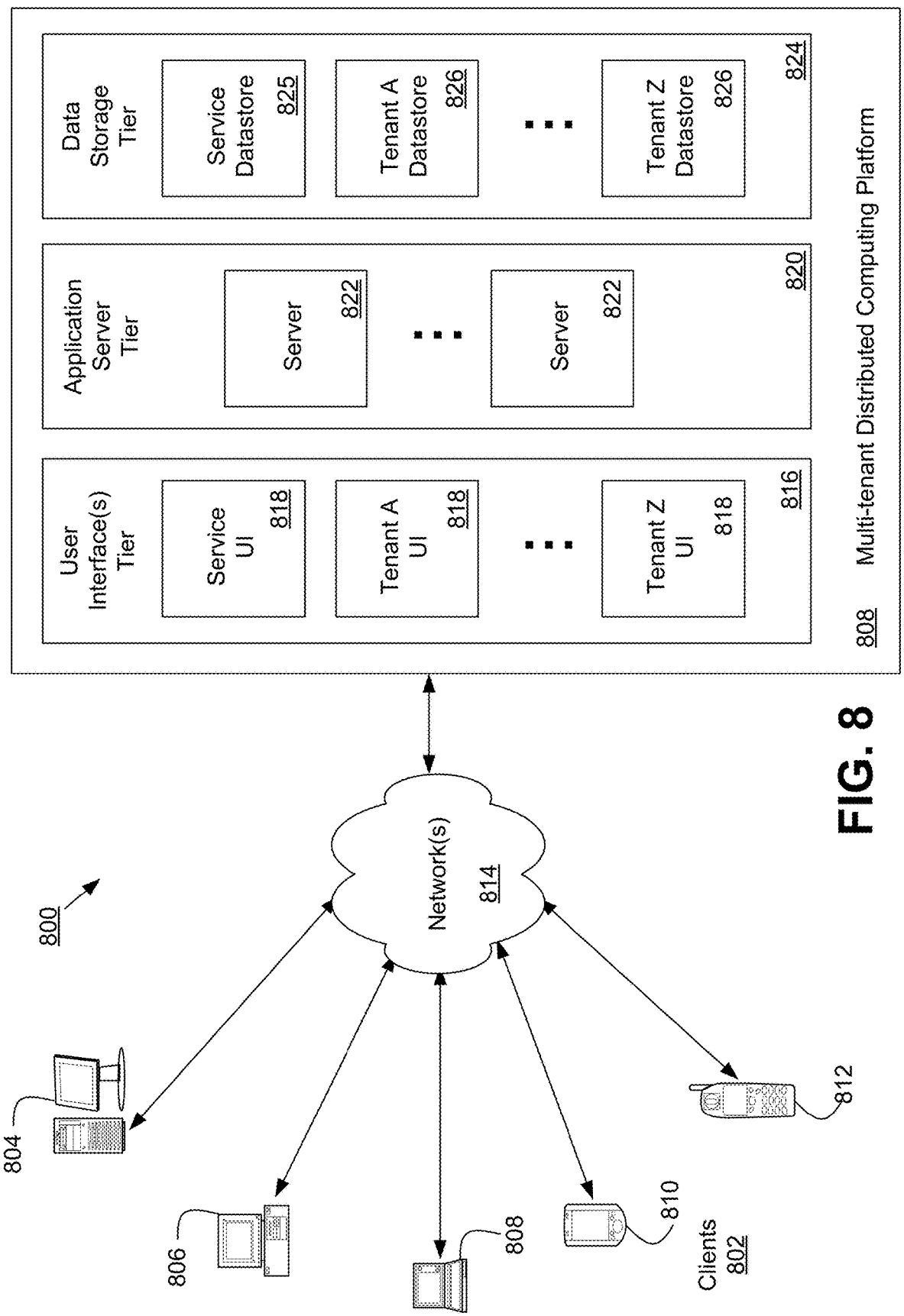
FIG. 8 illustrates an embodiment of a multi-tenant distributed computing service platform.

FIG. 8 is a diagram illustrating elements or components of an example operating environment 800 in which an embodiment of the present system and method may be implemented. As shown, a variety of clients 802 incorporating and/or incorporated into a variety of computing devices may communicate with a distributed computing service/platform 808 through one or more networks 814. For example, a client may incorporate and/or be incorporated into a client application (e.g., software) implemented at least in part by one or more of the computing devices.

Examples of suitable computing devices include specially programmed or configured personal computers, server computers 804, desktop computers 806, laptop computers 808, notebook computers, tablet computers or personal digital assistants (PDAs) 810, smart phones 812, cell phones, and consumer electronic devices incorporating one or more computing device components, such as one or more electronic processors, microprocessors, central processing units (CPU), or controllers that are specially programmed with instructions for implemented one or more embodiments as disclosed herein. Examples of suitable networks 814 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 808 may include multiple processing tiers, including a user interface tier 816, an application server tier 820, and a data storage tier 824. The user interface tier 816 may maintain multiple user interfaces 818, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 824 may include one or more data stores, which may include a Service Data store 825 and one or more Tenant Data stores 826.

Each tenant data store 826 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 808 may be multi-tenant and service platform 808 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 822 that are part of the platform's Application Server Tier 820.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 808 of FIG. 8(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 822 that are part of the platform's Application Server Tier 820.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 808 of FIG. 8).

As noted with regards to FIG. 7, the integrated business system shown in FIG. 8 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computing device causes the processor to:

construct pre-provisioned instances of a service within a first pool of a zone of computing resources, wherein the service executes executable code of at least one application using the computing resources, and wherein each pre-provisioned instance comprises a computing environment of computing resources configured for subsequent installation and subsequent execution of the executable code of the service, and wherein each pre-provisioned instance does not include the executable code of the at least one application installed therein;
construct pre-orchestrated instances of the service within a second pool, wherein each pre-orchestrated instance comprises a computing environment within which the executable code of the at least one application of the service is installed and is in a non-executing state;
in response to receiving a request for the service:
  execute the executable code of a first pre-orchestrated instance, from the second pool, as an executing instance of the service for remote access over a network by a remote device;
  remove the first pre-orchestrated instance from the second pool;
  replace the first pre-orchestrated instance in the second pool by selecting a pre-provisioned instance from the first pool and creating a replacement pre-orchestrated instance by installing the executable code of the at least one application into the selected pre-provisioned instance, wherein the executable code is in the non-executing state; and
  assign the replacement pre-orchestrated instance to the second pool and remove the selected pre-provisioned instance from the first pool.

2. The non-transitory computer-readable medium of claim 1, wherein the instructions comprise instructions to:
define an allocation metric for the first pool, wherein the allocation metric specifies a minimum number of pre-provisioned instances that are to be maintained within the first pool;
monitor demand for executing instances of the service;
perform trend analysis upon the demand to determine a shift in demand for the service; and
adjust the minimum number of pre-provisioned instances specified by the allocation metric based upon the shift in demand.

3. The non-transitory computer-readable medium of claim 1, wherein the instructions comprise instructions to:
define an allocation metric for the second pool, wherein the allocation metric specifies a minimum number of pre-orchestrated instances that are to be maintained within the second pool;
monitor demand for executing instances of the service;
perform trend analysis upon the demand to determine a shift in demand for the service; and
adjust the minimum number of pre-orchestrated instances specified by the allocation metric based upon the shift in demand.

4. The non-transitory computer-readable medium of claim 1, wherein the instructions comprise instructions to:
monitor demand for executing instances of the service;
perform trend analysis upon the demand to determine a shift in demand for the service;
perform predictive analysis upon the shift in demand to determine a projection that computing resources of a data center hosting the zone will become exhausted; and
transmit an alert of the projection over a network to a computer.

5. The non-transitory computer-readable medium of claim 1, wherein the instructions comprise instructions to:
in response to receiving a second request for the service;
determine whether there are pre-orchestrated instances within the second pool; and
in response to determining that there are no pre-orchestrated instances within the second pool, pre-orchestrate one or more pre-provisioned instances to create one or more pre-orchestrated instances for replenishing the second pool, wherein the one or more pre-orchestrated instances are created by installing the executable code into the one or more pre-provisioned instances in the non-executing state, and removing the one or more pre-provisioned instances from the first pool.

6. The non-transitory computer-readable medium of claim 1, wherein the instructions comprise instructions to:
specify an exhaustion threshold for the first pool; and
in response to a number of pre-provisioned instances within the first pool being below the exhaustion threshold, perform a pool recovery procedure to replenish the first pool.

7. The non-transitory computer-readable medium of claim 6, wherein the instructions to perform the pool recovery procedure comprise instructions to:
reallocate computing resources within a capacity buffer of the first zone to the first pool; and
create one or more pre-provisioned instances within the first pool utilizing the reallocated computing resources.

8. The non-transitory computer-readable medium of claim 6, wherein the instructions to perform the pool recovery procedure comprise instructions to:
implement a stop command to stop provisioning new instances of the service until the zone has a threshold amount of available computing resources to use for replenishing the first pool with one or more pre-provisioned instances of the service.

9. The non-transitory computer-readable medium of claim 1, wherein the instructions comprise instructions to:
assign the pre-provisioned instances to the first pool with a first collection of pointers;
assign the pre-orchestrated instances to the second pool with a second collection of pointers;
wherein removing the selected pre-provisioned instance from the first pool includes removing an associated pointer for the selected pre-provisioned instance from the first collection of pointers; and
wherein removing the first pre-orchestrated instance from the second pool includes removing an associated pointer for the first pre-orchestrated instance from the second collection of pointers.

10. A computing system, comprising:
a processor connected to memory; and
a management module stored on a non-transitory computer readable medium and configured with instructions that when executed by the processor cause the processor to:
  construct pre-provisioned instances of a service within a first pool of a zone of computing resources, wherein the service executes executable code of at least one application using the computing resources, and wherein each pre-provisioned instance comprises a computing environment of computing resources configured for subsequent installation and subsequent execution of the executable code of the service, and wherein each pre-provisioned instance does not include the executable code of the at least one application installed therein;
  construct pre-orchestrated instances of the service that are assigned to a second pool, wherein each pre-orchestrated instance comprises a computing environment within which the executable code of the at least one application of the service is installed and is in a non-executing state; and in response to receiving a request for the service:
execute, from the second pool, the executable code of a first pre-orchestrated instance as an executing instance of the service for remote access over a network by a remote device;
remove the first pre-orchestrated instance from the second pool;
replace the first pre-orchestrated instance in the second pool by orchestrating a selected pre-provisioned instance from the first pool to create a replacement pre-orchestrated instance within the second pool by installing the executable code into the selected pre-provisioned instance, wherein the executable code is in the non-executing state; and
assign the replacement pre-orchestrated instance to the second pool and remove the selected pre-provisioned instance from the first pool.

11. The computing system of claim 10, wherein the instructions comprise instructions that cause the processor to:
track deployment patterns of instances of the service being deployed;
determine a size for the first pool based upon the deployment patterns, wherein the size corresponds to a maximum number of pre-provisioned instances for the first pool; and
adjust a current size of the first pool to be the size.

12. The computing system of claim 11, wherein the instructions comprise instructions that cause the processor to:
determine a second size for the second pool based upon the size of the first pool such that the second size of the second pool is less than the size of the first pool, wherein the second size corresponds to a maximum number of pre-orchestrated instances for the second pool; and
adjust a current size of the second pool to be the second size.

13. The computing system of claim 10, wherein the instructions comprise instructions that cause the processor to:
determine a size for the second pool based upon a count of executing instances of the service and a historic error rate, wherein the size corresponds to a maximum number of pre-orchestrated instances for the second pool; and
adjust a current size of the second pool to be the size.

14. The computing system of claim 10, wherein the instructions comprise instructions that cause the processor to:
receive a decommission command for the executing instance of the service;
decommission a virtual machine hosting the executing instance using the computing resources of the zone; and
assign the computing resources to an available pool of computing resources of the zone.

15. The computing system of claim 14, wherein the instructions comprise instructions that cause the processor to:
utilize the computing resources within the available pool to create at least one of one or more pre-provisioned instances within the first pool or one or more pre-orchestrated instances within the second pool.

16. A computer-implemented method, the computer-implemented method involving a computing device comprising a processor, and the computer-implemented method comprising:
constructing, by the processor, pre-provisioned instances of a service within a first pool of a zone of computing resources, wherein the service executes executable code of at least one application using the computing resources, and wherein each pre-provisioned instance comprises a computing environment of computing resources configured for subsequent installation and subsequent execution of the executable code of the service, and wherein each pre-provisioned instance does not include the executable code of the at least one application installed therein;
constructing, by the processor, pre-orchestrated instances of the service within a second pool of the zone, wherein each pre-orchestrated instance comprises a pre-orchestrated computing environment within which the executable code of the at least one application of the service is installed and is in a non-executing state; and
in response to receiving a request for the service:
executing, by the processor, the executable code of a first pre-orchestrated instance from the second pool as an executing instance of the service for remote access over a network by a remote device;
removing, by the processor, the first pre-orchestrated instance from the second pool;
replacing the first pre-orchestrated instance in the second pool by orchestrating, by the processor, a pre-provisioned instance selected from the first pool to create a replacement pre-orchestrated instance by installing the executable code into the pre-provisioned instance, wherein the executable code is in the non-executing state; and
assigning the replacement pre-orchestrated instance to the second pool and removing, by the processor, the selected pre-provisioned instance from the first pool.

17. The computer-implemented method of claim 16, further comprising:
hosting executing instances of services within a plurality of zones of a data center;
identifying one or more zones of the plurality of zones that are utilized below a threshold;
consolidating the executing instances of the one or more zones into a zone; and
decommissioning the one or more zones to release computing resources of the one or more zones for repurposing by the data center.

18. The computer-implemented method of claim 16, further comprising:
hosting executing instances of services within a plurality of zones of a data center;
in response to receiving a request to create a zone, constructing the zone within the data center by:
creating a capacity buffer within the zone, wherein the capacity buffer comprises reserved computing resources;
creating a pre-provisioned pool within the zone, wherein pre-provisioned instances of services are created within the pre-provisioned pool;
creating a pre-orchestrated pool within the zone, wherein pre-orchestrated instances of services are created within the pre-orchestrated pool; and
creating an available resource pool of computing resources used to create the pre-provisioned instances and the pre-orchestrated instances.

19. The computer-implemented method of claim 16, further comprising:
queuing requests for execution of services within a queue; and dequeuing and implementing requests from the queue based upon a policy to stop deadlocks between requests for services.

20. The computer-implemented method of claim 16, further comprising: locking access to computing resources utilized by the executing service, wherein the computing resources are locked from being accessed by other executing services within the zone.

* * * * *

UNITED STATES PATENT AND TRADEMARK OFFICE
CERTIFICATE OF CORRECTION

PATENT NO. : 10,911,367 B2
APPLICATION NO. : 16/271966
DATED : February 2, 2021
INVENTOR(S) : Greenstein et al.

Page 1 of 1

It is certified that error appears in the above-identified patent and that said Letters Patent is hereby corrected as shown below:

In the Claims

In Column 26, Line 20, in Claim 7, before "zone" delete "first".

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*